United States Patent
Stolpman et al.

(10) Patent No.: US 9,625,603 B2
(45) Date of Patent: Apr. 18, 2017

(54) DOWNHOLE COMMUNICATION APPLICATIONS

(75) Inventors: Victor James Stolpman, Houston, TX (US); Ehud Barak, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 714 days.

(21) Appl. No.: 14/118,820

(22) PCT Filed: May 27, 2011

(86) PCT No.: PCT/US2011/038398
§ 371 (c)(1),
(2), (4) Date: Nov. 19, 2013

(87) PCT Pub. No.: WO2012/166100
PCT Pub. Date: Dec. 6, 2012

(65) Prior Publication Data
US 2014/0085098 A1 Mar. 27, 2014

(51) Int. Cl.
*G01V 3/18* (2006.01)
*G01V 3/34* (2006.01)

(52) U.S. Cl.
CPC . *G01V 3/18* (2013.01); *G01V 3/34* (2013.01)

(58) Field of Classification Search
CPC ............. H04L 25/03866; H04L 5/0044; H04L 1/0065; H04L 1/0061; H04L 1/0075
(Continued)

(56) References Cited

U.S. PATENT DOCUMENTS

| | | | |
|---|---|---|---|
| 5,010,333 A | 4/1991 | Gardner et al. | |
| 5,091,941 A * | 2/1992 | Needle | H04K 1/006 380/275 |

(Continued)

FOREIGN PATENT DOCUMENTS

| | | |
|---|---|---|
| EP | 1533965 A2 | 5/2005 |
| EP | 2267963 A2 | 12/2010 |

(Continued)

OTHER PUBLICATIONS

"U.S. Appl. No. 13/693,369, Non Final Office Action mailed Feb. 13, 2015", 15 pgs.
(Continued)

*Primary Examiner* — Emmanuel Bayard

(57) ABSTRACT

In some embodiments, an apparatus and a system, as well as a method and an article, may operate to transform acquired data into transformed data using at least one transform selected from a plurality of transforms according to an optimization metric calculation that operates on single, fixed-length packets of the transformed data, and a preselected quality criterion threshold. Further activity may include transmitting an amplified version of an electrical signal in a geological formation, the electrical signal including the transformed data. The amplified version may be received, and further activity may include transforming the transformed data into an estimate of acquired data, the transforming using at least one transform selected from a plurality of transforms according to an optimization metric calculation that operates on single, fixed-length packets of the transformed data and/or the estimate, and a preselected quality criterion threshold. Additional apparatus, systems, and methods are disclosed.

20 Claims, 24 Drawing Sheets

(58) Field of Classification Search
USPC .................................. 375/260, 295–297
See application file for complete search history.

(56) References Cited

U.S. PATENT DOCUMENTS

| | | | |
|---|---|---|---|
| 5,237,610 A * | 8/1993 | Gammie | H04N 7/162 |
| | | | 348/E5.004 |
| 5,365,229 A | 11/1994 | Gardner et al. | |
| 5,387,907 A | 2/1995 | Gardner | |
| 5,504,479 A | 4/1996 | Doyle et al. | |
| 5,515,386 A * | 5/1996 | Takizawa | H04L 49/40 |
| | | | 370/395.1 |
| 5,530,959 A * | 6/1996 | Amrany | H04L 25/03866 |
| | | | 380/268 |
| 5,887,061 A * | 3/1999 | Sato | H04N 7/1675 |
| | | | 348/409.1 |
| 6,091,932 A | 7/2000 | Langlais | |
| 6,351,538 B1 * | 2/2002 | Uz | H04N 5/913 |
| | | | 348/E7.056 |
| 6,657,597 B2 | 12/2003 | Rodney et al. | |
| 6,724,829 B1 * | 4/2004 | Tzukerman | H04L 25/03866 |
| | | | 375/295 |
| 6,738,935 B1 * | 5/2004 | Kimmitt | H04L 1/0045 |
| | | | 370/464 |
| 6,819,260 B2 | 11/2004 | Gardner et al. | |
| 6,820,230 B2 * | 11/2004 | Sweeney | H04J 14/02 |
| | | | 370/480 |
| 6,862,701 B2 * | 3/2005 | Walker | H04L 1/242 |
| | | | 714/715 |
| 6,864,802 B2 * | 3/2005 | Smith | G01D 21/00 |
| | | | 257/678 |
| 6,934,317 B1 * | 8/2005 | Dent | H04L 1/0003 |
| | | | 375/140 |
| 6,937,159 B2 | 8/2005 | Hill et al. | |
| 7,006,016 B1 * | 2/2006 | Feng | H03M 5/145 |
| | | | 341/58 |
| 7,024,653 B1 * | 4/2006 | Moore | H03K 19/17744 |
| | | | 326/101 |
| 7,061,405 B2 * | 6/2006 | Boyd | H04B 10/27 |
| | | | 341/50 |
| 7,132,958 B2 | 11/2006 | Dodge et al. | |
| 7,158,058 B1 * | 1/2007 | Yu | G11B 20/10 |
| | | | 341/58 |
| 7,162,682 B2 * | 1/2007 | Lewis | H03M 13/03 |
| | | | 370/351 |
| 7,187,298 B2 | 3/2007 | Gardner et al. | |
| RE39,771 E * | 8/2007 | Kobayashi | H03M 5/145 |
| | | | 341/58 |
| 7,305,043 B2 * | 12/2007 | Milbar | H04H 20/30 |
| | | | 375/295 |
| 7,430,262 B2 * | 9/2008 | Forte | H04J 3/0605 |
| | | | 370/515 |
| 7,443,312 B2 | 10/2008 | Quintero et al. | |
| 7,515,615 B2 * | 4/2009 | Peeters | H04J 13/00 |
| | | | 370/515 |
| 7,720,187 B2 * | 5/2010 | Mo | H04B 1/71632 |
| | | | 375/130 |
| 7,724,903 B1 * | 5/2010 | Kryzak | H04L 25/03866 |
| | | | 380/255 |
| 7,730,387 B2 * | 6/2010 | Yamazaki | H04L 9/3236 |
| | | | 714/807 |
| 7,738,601 B2 * | 6/2010 | Thaler | H03M 5/145 |
| | | | 370/471 |
| 7,761,776 B1 * | 7/2010 | Bataineh | H03M 13/091 |
| | | | 714/758 |
| 7,775,275 B2 | 8/2010 | Patel | |
| 7,787,525 B1 | 8/2010 | Clark, Jr. et al. | |
| 7,796,754 B2 * | 9/2010 | Kobayashi | G11B 20/00086 |
| | | | 360/60 |
| 7,808,404 B1 * | 10/2010 | Yu | G11B 20/10 |
| | | | 341/107 |
| 7,831,044 B2 * | 11/2010 | Yamamoto | G11B 20/00086 |
| | | | 380/225 |
| 7,865,802 B1 * | 1/2011 | Feng | H03M 5/145 |
| | | | 341/59 |
| 7,900,128 B1 * | 3/2011 | Feng | H03M 5/04 |
| | | | 714/701 |
| 7,996,747 B2 * | 8/2011 | Dell | H03M 13/03 |
| | | | 714/776 |
| 8,000,404 B2 * | 8/2011 | Talbot | H04L 25/03866 |
| | | | 327/141 |
| 8,020,069 B1 * | 9/2011 | Feng | G11B 20/1833 |
| | | | 714/758 |
| 8,024,640 B2 * | 9/2011 | Bliss | G11B 20/10194 |
| | | | 714/752 |
| 8,098,447 B1 * | 1/2012 | Oberg | G11B 20/10009 |
| | | | 360/25 |
| 8,244,129 B2 * | 8/2012 | Kaneko | H04B 10/0795 |
| | | | 398/33 |
| 8,364,977 B2 * | 1/2013 | Lablans | G06F 7/582 |
| | | | 713/189 |
| 8,370,716 B2 * | 2/2013 | Lin | G06F 11/0745 |
| | | | 714/769 |
| 8,392,781 B2 * | 3/2013 | Batra | H04L 1/1812 |
| | | | 714/748 |
| 8,446,921 B2 * | 5/2013 | Chen | H04L 12/40013 |
| | | | 370/503 |
| 8,503,547 B2 * | 8/2013 | Luo | H04B 1/70735 |
| | | | 375/259 |
| 8,559,480 B2 * | 10/2013 | Yoon | H04J 13/10 |
| | | | 375/130 |
| 8,605,224 B2 * | 12/2013 | Trager | H04N 5/44 |
| | | | 348/723 |
| 8,830,993 B1 * | 9/2014 | Dublin | H04L 49/45 |
| | | | 370/369 |
| 8,854,983 B2 * | 10/2014 | Romero | H04L 1/244 |
| | | | 370/241 |
| 8,867,654 B2 * | 10/2014 | Watanabe | H04L 25/03 |
| | | | 375/260 |
| 8,873,469 B2 * | 10/2014 | Hang | H04W 56/001 |
| | | | 370/329 |
| 8,948,313 B2 * | 2/2015 | Davey | H04L 25/06 |
| | | | 375/317 |
| 8,984,373 B2 * | 3/2015 | Yang | G06F 11/1048 |
| | | | 714/766 |
| 8,996,947 B2 * | 3/2015 | Chung | G11C 11/5628 |
| | | | 714/752 |
| 9,070,453 B2 * | 6/2015 | Sharon | G11C 11/5628 |
| 9,106,364 B1 * | 8/2015 | Singleton | H04K 1/00 |
| 9,178,713 B1 * | 11/2015 | Johnston | H04L 7/0075 |
| 2003/0011489 A1 | 1/2003 | Viswanathan | |
| 2003/0135798 A1 * | 7/2003 | Katayama | G11B 20/1833 |
| | | | 714/710 |
| 2004/0156264 A1 | 8/2004 | Gardner et al. | |
| 2004/0223553 A1 * | 11/2004 | Kumar | H04L 1/0059 |
| | | | 375/259 |
| 2005/0069317 A1 * | 3/2005 | Lee | H04J 14/0226 |
| | | | 398/67 |
| 2005/0227715 A1 * | 10/2005 | Riedl | H04B 1/04 |
| | | | 455/462 |
| 2005/0246754 A1 * | 11/2005 | Desai | H04L 12/2801 |
| | | | 725/118 |
| 2005/0270171 A1 | 12/2005 | Quintero et al. | |
| 2006/0126833 A1 * | 6/2006 | O'Leary | H04L 9/0668 |
| | | | 380/30 |
| 2006/0188001 A1 | 8/2006 | Mo et al. | |
| 2006/0221810 A1 * | 10/2006 | Vrcelj | H04L 27/2656 |
| | | | 370/208 |
| 2006/0248427 A1 * | 11/2006 | Katayama | G11B 20/1833 |
| | | | 714/746 |
| 2007/0046459 A1 | 3/2007 | Silverman et al. | |
| 2007/0290901 A1 * | 12/2007 | Hekstra | G11B 20/00086 |
| | | | 341/95 |
| 2008/0002854 A1 | 1/2008 | Tehranchi et al. | |
| 2008/0161043 A1 * | 7/2008 | Feher | H04B 1/69 |
| | | | 455/553.1 |
| 2009/0010431 A1 | 1/2009 | DeVries et al. | |
| 2009/0199072 A1 | 8/2009 | Akimov et al. | |

(56) References Cited

U.S. PATENT DOCUMENTS

| | | | |
|---|---|---|---|
| 2009/0252326 A1* | 10/2009 | Buchmann | G06F 13/4234 380/268 |
| 2009/0303972 A1* | 12/2009 | Flammer, III | H04B 1/7143 370/338 |
| 2010/0039286 A1 | 2/2010 | Robbins | |
| 2010/0074350 A1* | 3/2010 | Malladi | H04L 1/0041 375/260 |
| 2010/0291925 A1* | 11/2010 | Nagata | H04J 11/0069 455/434 |
| 2010/0316068 A1* | 12/2010 | Ornes | H04L 49/352 370/476 |
| 2011/0292932 A1* | 12/2011 | Nichols | H04L 12/5696 370/376 |
| 2012/0089757 A1* | 4/2012 | Abe | G06F 13/385 710/106 |
| 2012/0229293 A1 | 9/2012 | Weerasinghe | |
| 2012/0237036 A1* | 9/2012 | Dabak | H05K 5/0278 380/287 |
| 2012/0257697 A1* | 10/2012 | Zhou | H04B 7/1858 375/346 |
| 2013/0093597 A1 | 4/2013 | Stolpman et al. | |
| 2013/0124781 A1 | 5/2013 | Sadashivappa | |
| 2013/0230172 A1* | 9/2013 | Lablans | G06F 7/584 380/268 |
| 2015/0103807 A1* | 4/2015 | Montojo | H04B 7/024 370/335 |
| 2015/0229439 A1 | 8/2015 | Stolpman et al. | |
| 2016/0119094 A1* | 4/2016 | Varadarajan | H04L 23/02 375/295 |

FOREIGN PATENT DOCUMENTS

| | | | |
|---|---|---|---|
| EP | 2469308 A1 | 6/2012 | |
| RU | 2455460 C2 | 7/2012 | |
| WO | WO-0251086 A2 | 6/2002 | |
| WO | WO-2007046459 A1 | 3/2007 | |
| WO | WO-2009010431 A1 | 1/2009 | |
| WO | WO-2010039286 A1 | 2/2010 | |
| WO | WO-2010/054391 A2 | 5/2010 | |
| WO | WO-2012166100 A1 | 12/2012 | |

OTHER PUBLICATIONS

"U.S. Appl. No. 13/693,369, Response filed May 13, 2015 to Non Final Office Action mailed Feb. 13, 2015", 9 pgs.
"International Application Serial No. PCT/US2012/066643, International Preliminary Report on Patentability mailed Jun. 11, 2015", 8 pgs.
Muthiah. R., et al., "Lossless Compression Using LFSRs", *Journal of Computer Science*, vol. 3, Issue 1, (Jan. 2007), 25-27.
"U.S. Appl. No. 13/693,369, Advisory Action mailed Nov. 24, 2015", 5 pgs.
"U.S. Appl. No. 13/693,369, Final Office Action mailed Sep. 3, 2015", 18 pgs.
"U.S. Appl. No. 13/693,369, Non Final Office Action mailed Dec. 31, 2015", 16 pgs.
"U.S. Appl. No. 13/693,369, Response filed Mar. 31, 2016 to Non Final Office Action mailed Dec. 31, 2015", 11 pgs.
"U.S. Appl. No. 13/693,369, Response filed Nov. 2, 2015 to Final Office Action mailed Sep. 3, 2015", 10 pgs.
"Australian Application Serial No. 2012395845, First Examiner Report mailed Aug. 25, 2015", 3 pgs.
"Australian Application Serial No. 2012395845, Response filed Jan. 4, 2016 to First Examiner Report mailed Aug. 25, 2015", 14 pgs.
"Chinese Application Serial No. 201280077047.7, Office Action mailed Mar. 17, 2016", (w/ English Translation), 17 pgs.
"European Application Serial No. 12889019.1, Office Action mailed May 18, 2015", 3 pgs.
"European Application Serial No. 12889019.1, Response filed Nov. 17, 2015 to Office Action mailed May 18, 2015", 12 pgs.
Cariolaro, G, et al., "Pulse Position Modulation", (Apr. 15, 2003), 1-17.
Memarzadeh, Mahsa, "Optimal Borehole Communication Using Multicarrier Modulation", Thesis, Doctor of Philosophy, Rice University, Houston, TX. [online]. [retrieved on Apr. 25, 2016]. Retrieved from the Internet: <URL: https//scholarship.rice.edu/bitstream//handle/1911/20631/3256724.PDF?sequence=1>, (Jan. 2007), 94 pgs.
"Part 11: Wireless LAN Medium Access Control (MAC) and Physical Layer (PHY) Specifications, Amendment 5: Enhancements for Higher Throughput", IEEE 802.11n. Local and metropolitan area networks. IEEE Computer Society., (Oct. 29, 2009), 536 pgs.
"Supplement to IEEE Standard for Information technology—telecommunications and information exchange between systems—local and metropolitan area networks—specific requirements. Par II: wireless LAN Medium Access Control (MAC) and Physical Layer (PHY) specifi", IEEE STD 802.11a-1999, IEEE Computer Society, New York, NY, (1999), 91 pgs.
"U.S. Appl. No. 13/693,369, Advisory Action mailed Oct. 6, 2016", 4 pgs.
"U.S. Appl. No. 13/693,369, Final Office Action mailed Jul. 29, 2016", 13 pgs.
"U.S. Appl. No. 13/693,369, Response filed Sep. 16, 2016 to Final Office Action mailed Jul. 29, 2016", 9 pgs.
"Canadian Application Serial No. 2,891,314, Office Action mailed Jun. 10, 2016", 4 pgs.
"Chinese Application Serial No. 201280077047.7, Response filed May 26, 2016 to Office Action mailed Mar. 17, 2016", (w/ English Translation of Claims), 49 pgs.
"Malaysian Application Serial No. PI 2015001242. Preliminary Examination mailed Dec. 8, 2015", 2 pgs.
"Russian Application Serial No. 2015114968, Office Action mailed Jul. 14, 2016", (English Translation), 13 pgs.
"International Application Serial No. PCT/US2011/038398, International Search Report mailed Sep. 21, 2011", 2 pgs.
"International Application Serial No. PCT/US2011/038398, Written Opinion mailed Sep. 21, 2011", 4 pgs.
"International Application Serial No. PCT/US2012/066643, International Search Report mailed May 30, 2013", 3 pgs.
"International Application Serial No. PCT/US2012/066643, Written Opinion mailed May 30, 2013", 6 pgs.
Bohge, M., et al., "The Potential of Dynamic Power and Sub-carrier Assignments in Multi-User OFDM-FDMA Cells", In: Proceedings of IEEE Globecom 2005, (St. Louis, MO), (Nov. 2005), 5 pgs.
Wyglinski, A., "Physical Layer Loading Algorithms for Indoor Wireless Multicarrier Systems", Thesis, Department of Electrical & Computer Engineering, McGill University, Montreal, Canada, (Nov. 2004), 184 pgs.
Zhang, Z.-Y., et al., "A novel OFDM transmission scheme with length-adaptive Cyclic Prefix", Journal of Zhejiang University Science, 5(11), (2004), 1336-1342.
"International Application Serial No. PCT/US2011/038398, International Preliminary Report on Patentability mailed Dec. 12, 2013", 6 pgs.
U.S. Appl. No. 14/432,434, filed Mar. 30, 2015, Communication Applications.
U.S. Appl. No. 13/693,369, filed Dec. 4, 2012, Communication Applications.

* cited by examiner

DOWNHOLE COMMUNICATION APPLICATIONS

RELATED APPLICATIONS

This application is a U.S. National Stage Filing under 35 U.S.C. 371 from International Application Number PCT/US2011/038398, filed on 27 May 2011, and published as WO 2012/166100 A1 on 6 Dec. 2012; which application and publication are incorporated herein by reference in their entirety.

BACKGROUND

Drilling rig operators often employ the use of Measurement-While-Drilling (MWD) and Logging-While-Drilling (LWD) tools and services during drilling operations, to measure and/or log various conditions within the borehole and/or the rock formations surrounding the borehole. MWD/LWD tools utilize a variety of sensors to sample and aggregate digital values for real-time transmission to the surface during drilling operations. The transmission scheme and channel medium may vary. For example, they may include Mud Pulse Telemetry (MPT) through water and drilling mud, Electro-Magnetic-Telemetry (EMT) through rock formations, and Acoustic Telemetry (AT) via the drill-string. Each scheme typically employs some form of modulation (e.g. Pulse-Position-Modulation (PPM), Orthogonal Frequency Division Multiplexed (OFDM), and Direct Sequence Spread Spectrum (DSSS)) to increase the reliability of communication through the associated medium.

When either OFDM or DSSS modulation are used, the transmit peak-to-average-power-ratio (PAPR) is often poor (i.e., relatively high), as compared to other processes, even though error rates may be improved. As a result, a more expensive transmitter power amplifier, with a higher dynamic range, is often used to maintain a desired level of reliability within a given communication system.

DETAILED DESCRIPTION

Figure 1:
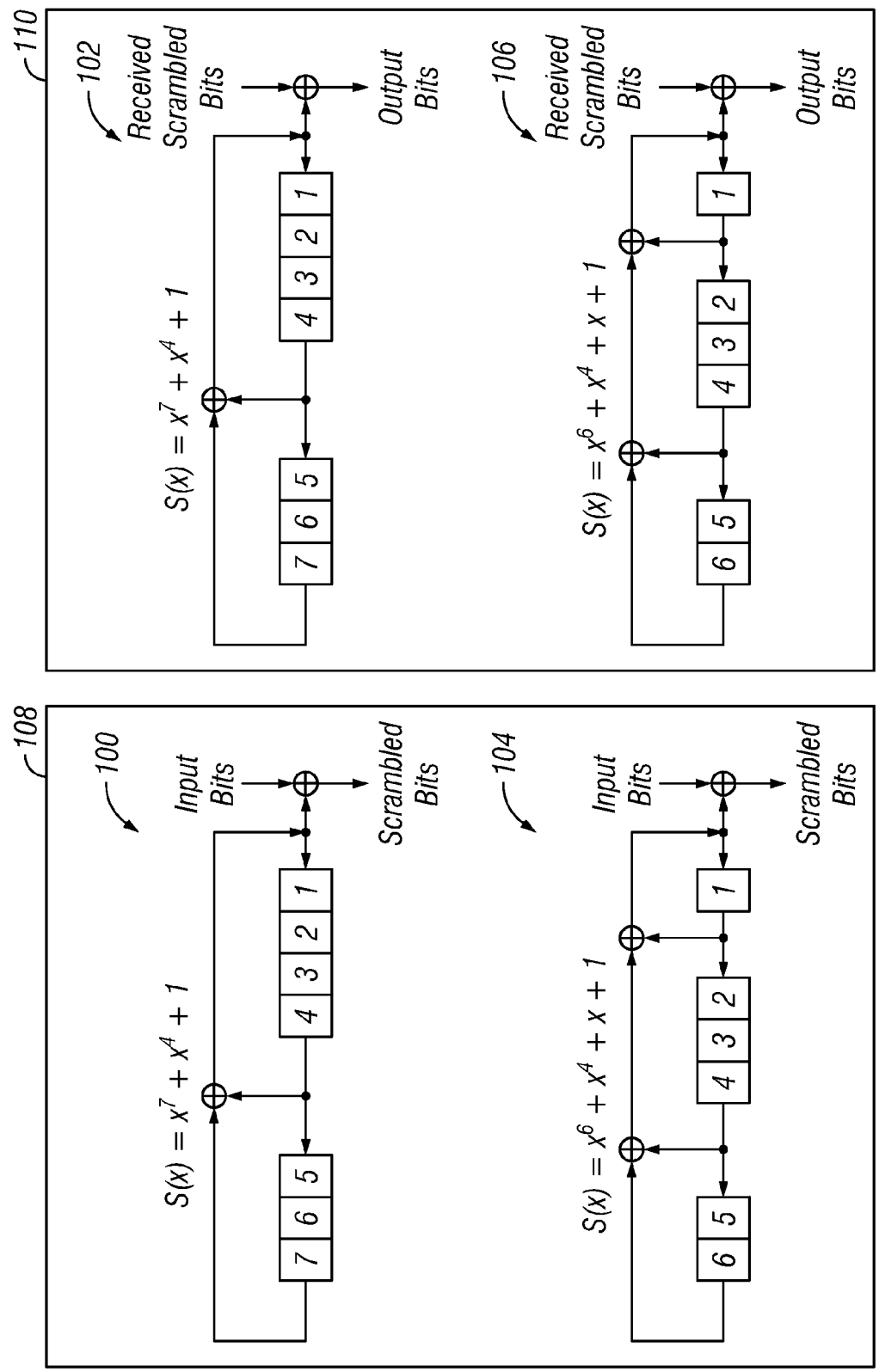
FIG. 1 illustrates examples of scrambler transforms at the transmitter and the receiver, according to various embodiments of the invention.

In some embodiments, data to be communicated within a drilling system, from sub-surface to surface, and vice-versa, is transformed by selecting a transform from a plurality of transforms to improve (i.e., reduce) the transmit PAPR of the signal that carries the data within a rock formation using multi-carrier/waveform modulation, without materially reducing the decoding rate. The terms "rock formation" and "geological formation" are used interchangeably herein, referring in all cases to materials that make up the surface and subsurface of the Earth. The solution provided by this process can be used to more efficiently and accurately communicate data within underground formations.

As used in this document, a "scrambler" is a processing device comprising electrical hardware that operates to manipulate a data stream before transmission into a communications channel. The manipulations are reversed by a "descrambler" at the receiving end of the communications channel. Scrambler types may include additive and multiplicative scramblers. Scrambling is widely used in satellite, radio relay communications, and PSTN (public switched telephone network) modems. In some embodiments, a scrambler is placed just before a FEC (forward error correction) coder, or it can be placed after the FEC, just before the modulation or line code. A scrambler in this context has nothing to do with encrypting, as the intent is not to render the message unintelligible, but to impart useful properties to the transmitted signal. For example, the scrambler may operate to transform digital sequences into other sequences, without removing undesirable sequences, to reduce the probability of vexatious sequence occurrence.

Scramblers have been used in the past to "whiten" digitized data, providing adaptive equalization in a receiver, or flattening the power spectral density of a transmitter's output. These uses are contrary to the teachings provided herein, since the various embodiments operate to locally flatten the time-domain transmission amplitude within a packet, and not the ergodic frequency content of the overall signal. Indeed, the use of scramblers in various embodiments, as described herein, may result in greater frequency variance across subcarriers or spreading codes (e.g., in the case of quadrature amplitude modulation), and increase the local periodic characteristic within modulated packets of digitized data, depending on the choice of modulation for each subcarrier.

To reduce PAPR in a transmitted signal, some embodiments include an apparatus electrically connected with a drill string configured to produce electrical current in a rock formation comprising. The apparatus may comprise a power source, and an amplifier electrically connected to the power source. The amplifier is used to vary an adjustable voltage output to produce changes in electrical current traveling through a rock formation. The apparatus uses a controller that operates the amplifier to create a plurality of changes in the electrical current passing through the rock formation via multiple waveform modulation, wherein the controller formats digital data into packets using a transform selected from a plurality of available transforms.

Transmitter embodiments may use a form of multiple waveform modulation, e.g. OFDM (orthogonal frequency-division multiplexing) or DSSS (direct-sequence spread spectrum). The multiple waveforms within OFDM modulation aggregate a plurality of sinusoidal subcarriers orthogonal with respect to each other, where each subcarrier is further modulated using more conventional modulation approaches, e.g. PSK (phase-shift keying) and QAM. The aggregation may cause constructive superposition, so that subcarrier amplitudes present large absolute amplitude peaks relative to the average absolute amplitude over the symbol period. Hence, OFDM transmission signals often experience a poor PAPR, leading to poor telemetry throughput unless circuit complexity is significantly increased.

Under a DSSS scheme, an aggregation of a plurality of chip sequences, preferably with low cross-correlation properties, is transmitted. Thus, DSSS transmission also may suffer from a poor PAPR.

Under either OFDM or DSSS, when the PAPR is poor, a more expensive transmitter power amplifier, with a higher dynamic range, is often used to maintain a desired reliability of communication. Various embodiments described herein operate to transform a packet of predetermined length into OFDM or DSSS symbols with a reduced PAPR, reducing constraints on power amplifier dynamic range, while providing the same communication reliability.

Thus, some embodiments may include a system to communicate through a rock formation that comprises a transmitter configured to modulate a current with transformed digital data and to transmit the modulated current through a rock formation. The modulated current may comprise a superposition of a plurality of waveforms. The system may further include a receiver configured to demodulate the current, to select a transform from a plurality of transforms, and to use the selected transform to operate on the demodulated information, providing the digital data forming part of at least one packet, using an error detection code.

FIG. 1 illustrates examples of scrambler transforms 100, 102, 104, 106 at the transmitter and the receiver, according to various embodiments of the invention. Thus at the transmitter, one embodiment uses a transform selected from a set of transforms 100, 104 where each comprises a linear feedback shift register (LFSR) configured according to a polynomial descriptor. Each register can accept an initial state value/indicator for the memory elements within the LFSR. The number of memory elements may indicate the largest possible cardinality of the transform set. Thus, the transmitter may have at least one scrambler 108 that includes one or more transforms 100, 104, perhaps taking the form of LSFRs, to transform, e.g. scramble, digital values according to a polynomial indicator and an initial value, possibly using Galois Field arithmetic (GF), such as modulo-2 arithmetic. The transforms 100, 102, 104, 106 may also be implemented with hardware or hardware executing software/firmware instructions that provides a unitary transform, spherical codes, and other matrix transforms.

Some embodiments operate to communicate through a rock formation as a system. The system may comprise a transmitter configured to modulate a current through the rock formation, where the current comprises a superposition of a plurality of waveforms. The system may comprise a plurality of initial state indicators accessible to the transmitter to enable scrambling digital data. The system may further comprise a receiver configured to demodulate the signal provided by the current, and to select an initial state indicator from a plurality of initial state indicators accessible to the receiver. The receiver may further comprise transforms 102, 106, perhaps taking the form of LSFRs, to descramble the transformed digital data using a descrambler 110 and an error detection code to determine the digital data within at least one packet. An initial value of all zeroes may operate to disable the scrambler 108 or descrambler 110.

Figure 2:
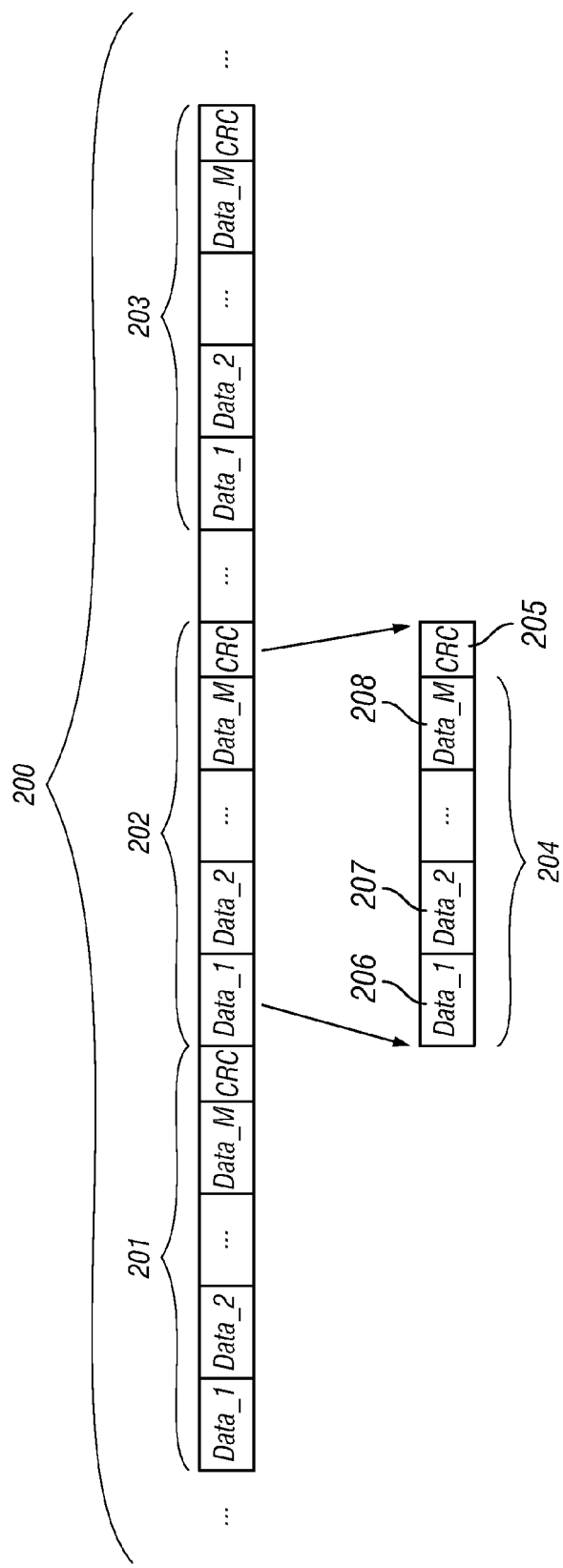
FIG. 2 illustrates a bit-stream format concatenating packets of fixed numbers of bits, according to various embodiments of the invention.

FIG. 2 illustrates a bit-stream format 200 concatenating packets 201, 202, 203 of fixed numbers of bits, according to various embodiments of the invention. Each packet 201, 202, 203 includes information in the form of data 204 (e.g., bits, bytes or words 206, 207, 208) and cyclic redundancy check information 205. In some embodiments, the bit-stream format 200 is transmitted and received using scrambled data 204.

Figure 3:
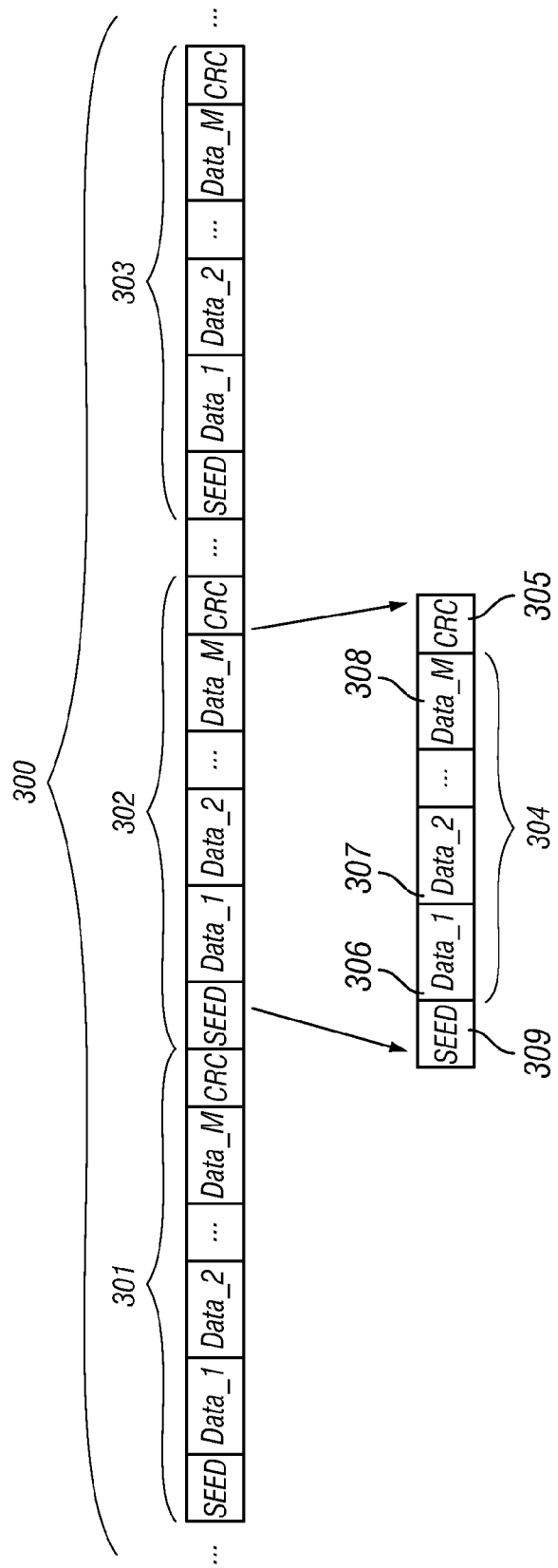
FIG. 3 illustrates a bit-stream format concatenating fixed length packets with SEED values, according to various embodiments of the invention.

FIG. 3 illustrates a bit-stream format 300 concatenating fixed length packets 301, 302, 303 with SEED values 309, according to various embodiments of the invention. Here each packet 301, 302, 303 includes information in the form of data 304 (e.g., bits, bytes or words 306, 307, 308), cyclic redundancy check information 305, and a SEED value 309, which represents the initial content of an LFSR.

Figure 4:
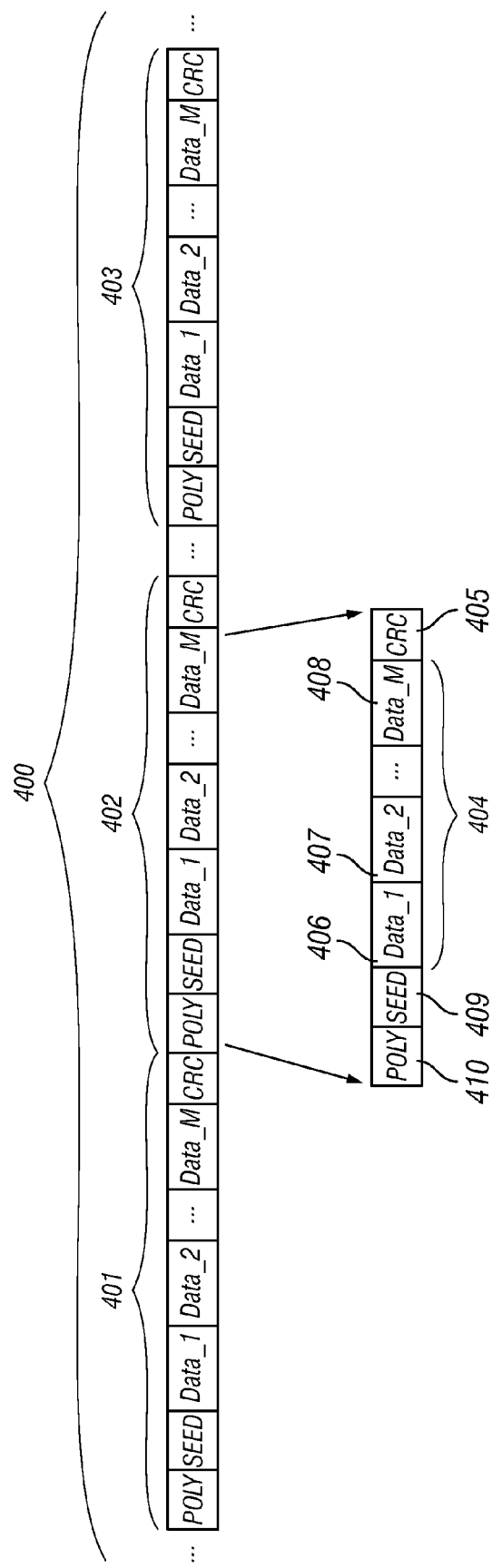
FIG. 4 illustrates a bit-stream format concatenating fixed length packets with SEED and POLY values, according to various embodiments of the invention.

FIG. 4 illustrates a bit-stream format 400 concatenating fixed length packets 401, 402, 403 with SEED and POLY values 409, 410, according to various embodiments of the invention. Here each packet 401, 402, 403 includes information in the form of data 404 (e.g., bits, bytes or words 406, 407, 408), cyclic redundancy check information 405, a SEED value 409, and a POLY value 410, which represents the polynomial descriptor for the transform that has been selected, perhaps to be implemented by an LFSR.

Thus, transmitters may operate to select different initial content values, or SEEDs, for one or more LSFRs. Transmitters that operate in this manner may transform a given set of digital data input bits differently, using different SEEDs, resulting in potentially different PAPR characteristics for each selection. The transmitter can then include the selected SEED within the bit-stream modulated for transmission, as shown in FIGS. 3 and 4.

A controller within the transmitter may operate to account for the SEED initial value indicator when calculating the various PAPRs for each transformed digitized value, perhaps as part of calculating optimization metrics for each possible SEED given a LSFR configured to implement a particular polynomial descriptor, POLY. Thus, transmitters in some embodiments may use the PAPR as a predetermined optimization criterion. In other embodiments, the SEED and/or POLY values that pertain to the transform used at the transmitter may or may not (e.g., see FIG. 2) be included in the formatted bit-stream and/or encoded, modulated waveforms. Likewise, various receiver embodiments at the receiver may or may not use any SEED and/or POLY values to decode transmitted packets. This tradeoff may involve additional receiver complexity (more calculations), as various possible combinations for SEED and/or POLY various are tested to determine which produces a series of correctly unscrambled packets.

In some embodiments, a controller calculates at least one optimization metric relating to a predetermined criterion (e.g., selecting a threshold acceptable error rate) for at least one transform within a plurality of transforms. The controller may include a memory device to store one or more optimization metrics, as determined by a predetermined criterion. Memory devices may include one or more of a register or cache memory within a microcontroller or microprocessor, a register comprising of digital logic within a programmable device and/or ASIC (application-specific integrated circuit), random access memory (RAM), and non-volatile storage, such as FLASH memory, programmable read-only memory, and/or a hard-drive.

The controller may operate to select a transform from a plurality of transforms corresponding to a minimal (i.e. a metric near a minimum) optimization metric, such as the PAPR, or the minimum PAPR. Likewise, the controller may operate to select an equivalent maximal (i.e. a metric near a maximum) optimization metric, such as 1/PAPR, or the maximum 1/PAPR.

Figure 5:
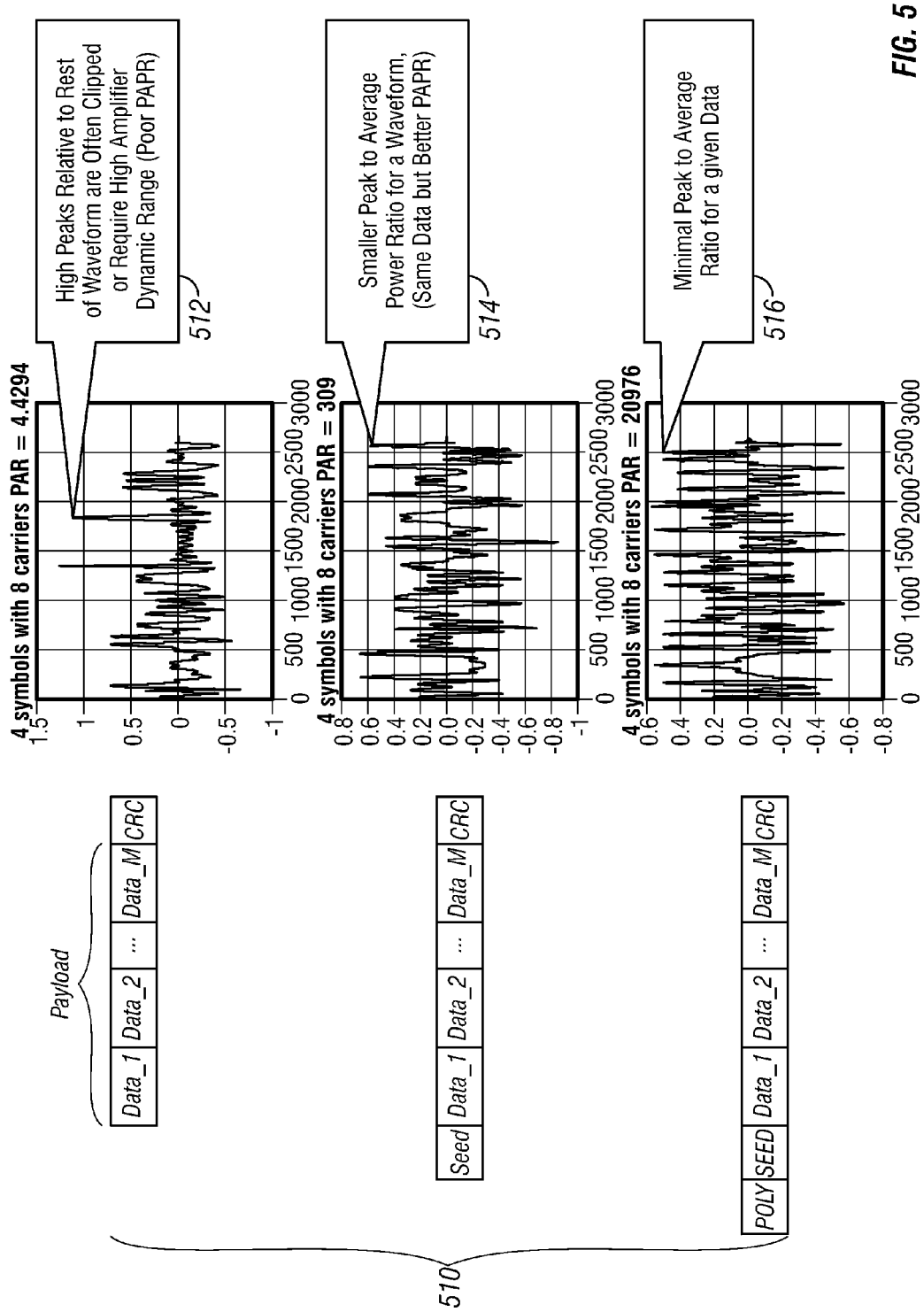
FIG. 5 illustrates transmission bit-streams that may be used to reduce PAPR, according to various embodiments of the invention.

FIG. 5 illustrates transmission bit-streams 510 that may be used to reduce PAPR, according to various embodiments of the invention. Here it can be seen that scrambling the data with a fixed POLY value and optimized SEED value results in a reduction of PAPR 514 given the same input data bitstream as in 512 that has not been optimized for PAPR. Even further reduction in PAPR may be achieved by determining an optimized POLY value for a configurable LSFR scrambler in conjunction with an optimized SEED value for the configurable LSFR scrambler as in 516 given the same input data bitstream as in 512 and 514. For illustration purposes, FIG. 5 includes SEED and POLY values within the transmission of the bit stream, slight increasing the time of transmission. In practice, including SEED and POLY values within the transmission may be useful to reduce receiver complexity. However, in some embodiments, the system may benefit from selecting and using an optimized transform, saving time by not including the SEED and POLY values in the bit stream to be modulated.

Alternative embodiments of the optimization metric may us the estimated probability of receiving a packet in error, given channel state information. Likewise, the optimization metric might comprise using the estimated probability of receiving the packet correctly (e.g., a packet rejection region may or may not be present in the metric).

A method embodiment operates to communicate through a rock formation by calculating at least one optimization metric relating to a predetermined optimization criterion, using the optimization metric to select one of a plurality of initial state indicators available to a transmitter, and scrambling digital data using the selected initial state indicator (which may enable the receiver to perform an error-detection check). Additional activities may include transmitting the scrambled digital data through the rock formation using a modulated waveform comprising a superposition of multiple waveforms, receiving the transmitted waveform from the rock formation, demodulating the received waveform into a plurality of demodulated values, and identifying packet errors using the demodulated values, the selected transform, and an error detection code.

Figure 6:
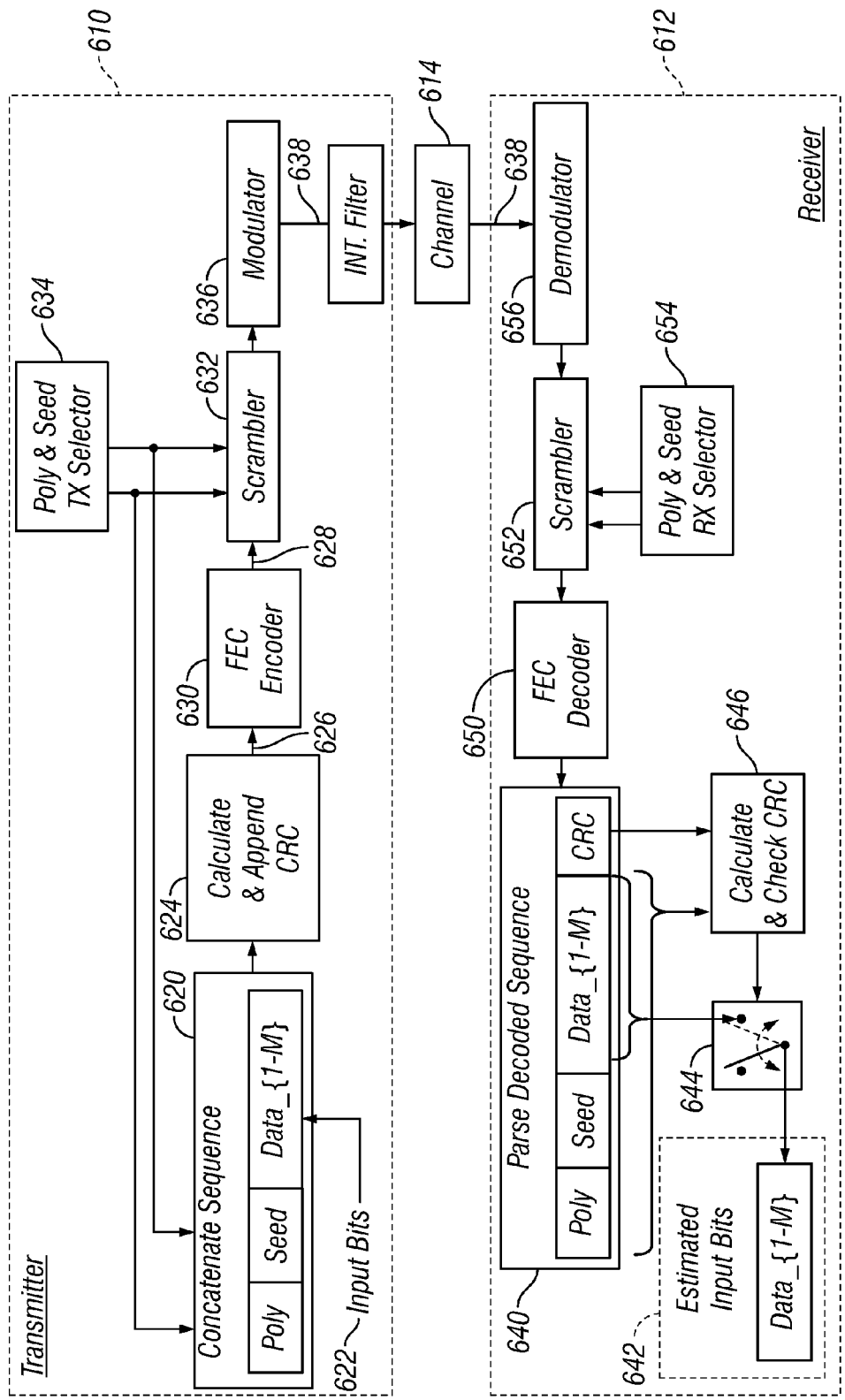
FIGS. 6-16 illustrate block diagrams of transmitters and receivers, according to various embodiments of the invention.
Figure 7:
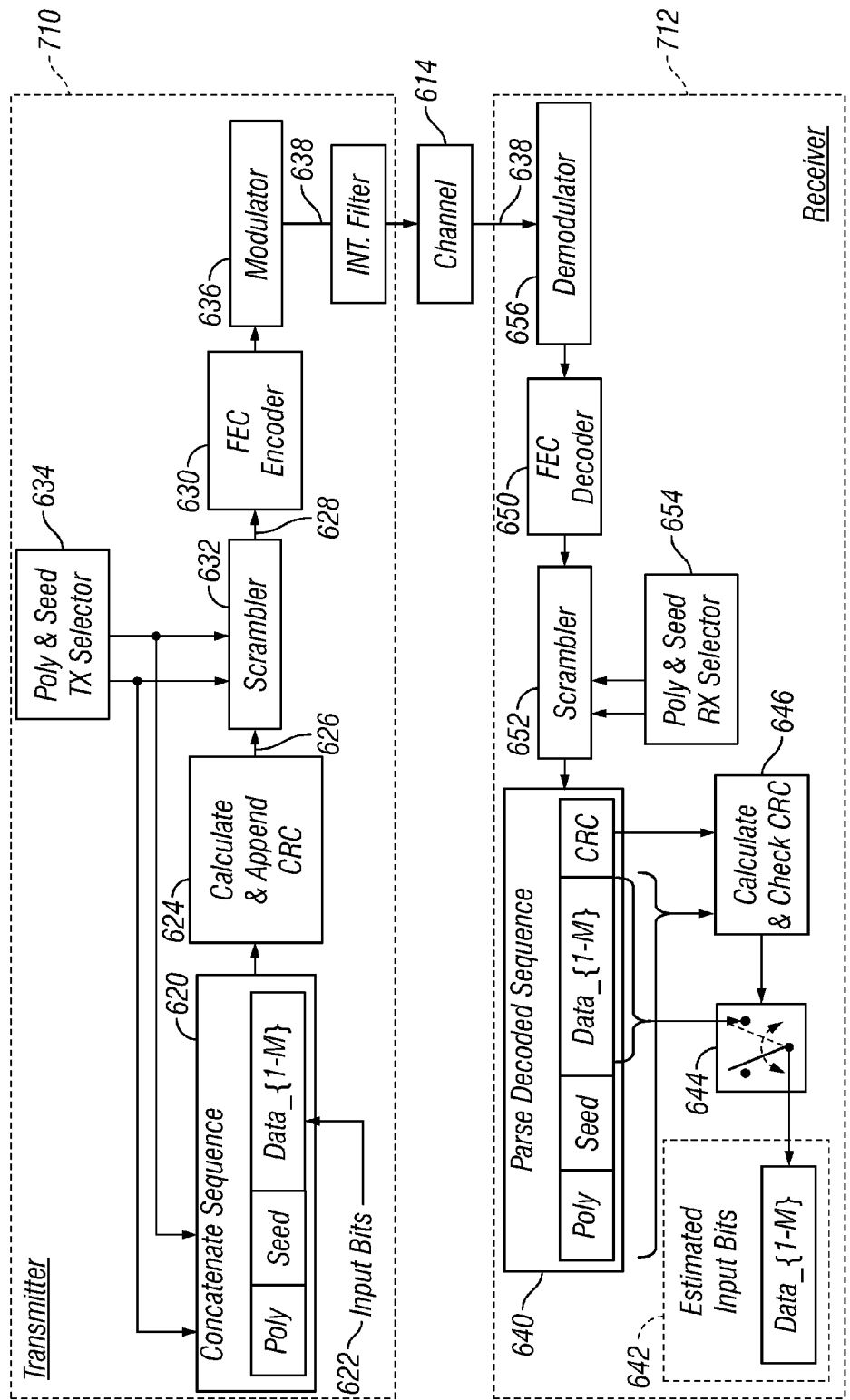
Figure 8:
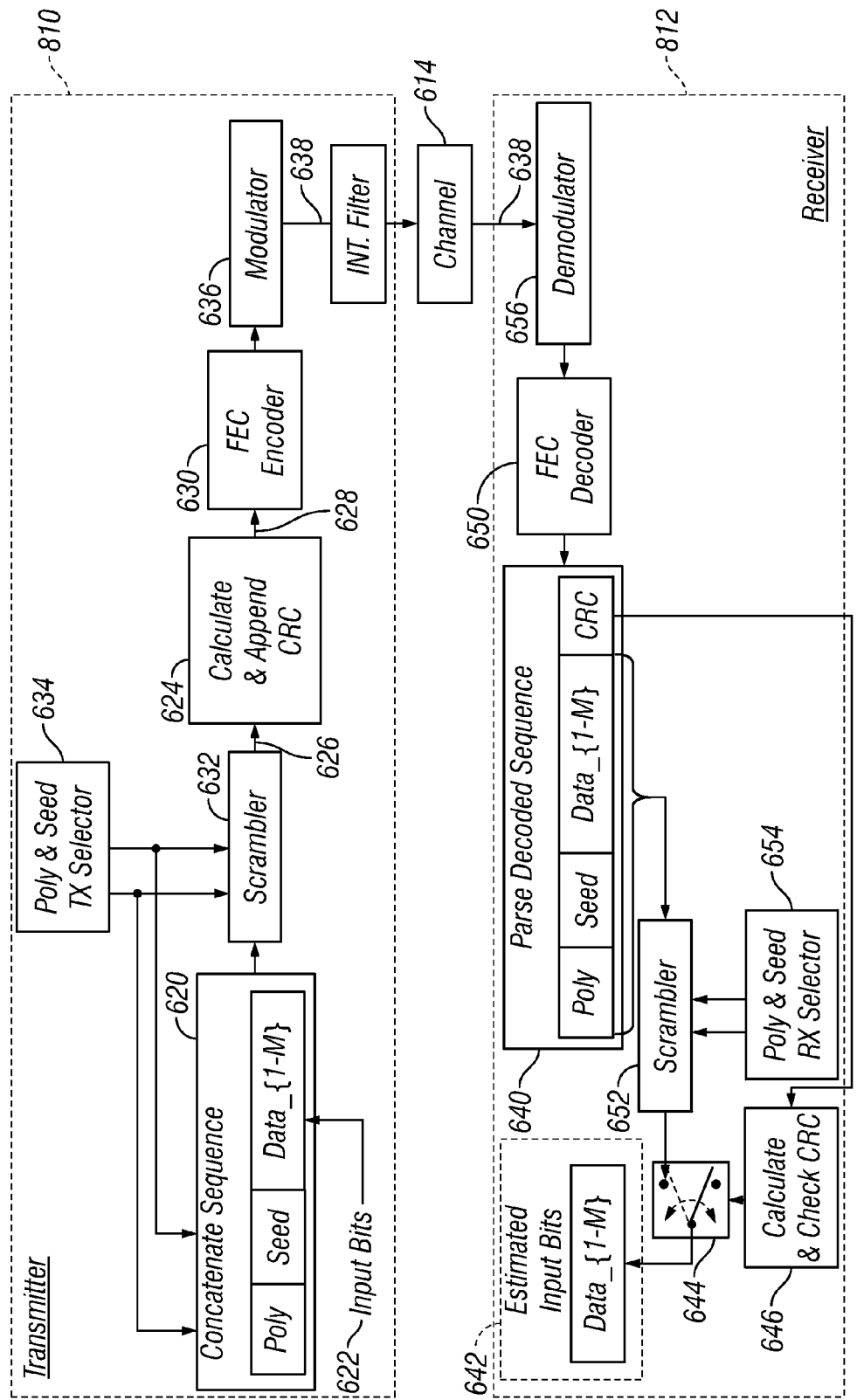

FIG. 6 illustrates a block diagram of a transmitter 610 and receiver 612, according to various embodiments of the invention. FIG. 7 illustrates a block diagram of a transmitter 710 and receiver 712, according to various embodiments of the invention. FIG. 8 illustrates a block diagram of a transmitter 810 and receiver 812, according to various embodiments of the invention.

Referring now to FIGS. 6-8, it can be seen that a transmitter can operate on a concatenated sequence of information (comprising SEED and POLY values, as well as a data payload 622) 620. A transmitted CRC processor 624 can operate on its input (the information 620 in this case) to calculate and append a CRC value to the information 620. A FEC (forward error correction) encoder 630 may operate on its input (the information 620, augmented by an associated CRC value in this case, which provides augmented information 626) to calculate and append error correcting code(s) to the augmented information 626, providing additional information 628.

The output of the FEC encoder 630 (i.e., additional information is scrambled by a scrambler 632, which may comprise one or more transforms (e.g., transforms 100, 104), perhaps taking the form of LFSRs. The operation of the scrambler 632 may be influenced by POLY and SEED values selected by the transmission selector 634, which may in turn be selected as fixed or variable values, perhaps according to minimal/minimum PAPR calculations, maximal/maximum 1/PAPR calculations, or other metric optimization calculations. The selected SEED and POLY values may be provided to the concatenated sequence 620, as well as to the scrambler 632.

The output of the scrambler 632 is modulated by the modulator 636 (e.g., an OFDM or DSSS modulator), before entering the communications channel 714 as transformed data 638. The transformed data 638 may be amplified using a power amplifier (not shown at the output of the transmitter 610).

A receiver 612 can operate to receive the transformed data 638, which is demodulated by the demodulator 656 to provide demodulated data. A descrambler 652 (which may be similar to or identical to the scrambler 632) can operate on the demodulated data to provide descrambled data. A FEC decoder 650 can apply the error correcting code(s) to the descrambled data to provide a decoded data sequence 640.

The demodulator 656 may provide either hard or soft detection. If soft detection is used, the payload bits may be estimated by the estimator 642 and selectively applied, using the selector 644, so that the correct CRC appears, as calculated by the received CRC processor 646.

In FIGS. 7 and 8, the components of the transmitter 610 and receiver 612 shown in FIG. 6 have been arranged in a different order, to permit processing acquired data (e.g., input bits 622) differently, providing essentially different transmitter/receiver combinations 710, 712 and 810, 812. Thus, many embodiments may be realized.

For example, some transmitter embodiments use scramblers 632 that employ configurable LSFRs transmit the polynomial descriptor, POLY, with the SEED descriptor, and may include one or both values within the optimization metric and optimization criterion. The plurality of available transforms may be implemented using at least one configurable LFSR used to receive a polynomial indicator from a plurality of possible polynomial indicators that described feedback connections to the LFSR.

In some embodiments, the optimization metric and predetermined optimization criterion in the transmitter may or may not use peak or average powers or amplitude or their ratios. Indeed, the POLY and SEED indicators may or may not be transmitted along with the transformed data (e.g., see examples of different potential transmission bit streams 510, prior to transformation, shown in FIG. 5).

The plurality of available transforms within a scrambler may or may not utilize initial values identifying different transforms. Receivers may or may not use formatted data to exhaustively search for sequences that result in determining the SEED and/or POLY values utilized by the transmitter. The tradeoff in these cases may be receiver complexity versus bandwidth efficiency.

In some embodiments, a transmitter within a communications system transforms and transmits digital data within a packet using a modulation resembling the superposition of multiple waveforms. The transmitter comprises an amplifier having a peak output voltage with a selected dynamic range, a plurality of available transforms, a transform selector to select at least one of the transforms such that the modulated output voltage of the amplifier provides at least one packet of transformed digital values that avoids non-linear distortion after the application of an interpolation filter, wherein the selected transform enables error detection at the receiver. The interpolation filter allows the insertion of data into the bit stream, ahead of the amplifier. The transmitter may comprise one or more connectors to provide connections to a drill string and/or well casing.

In some embodiments, the transmitter includes a plurality of initial state indicators, and an initial state indicator selector to select at least one initial state indicator from the plurality of initial state indicators to avoid non-linear distortion after the application of the interpolation filter. In some embodiments, the transmitter includes a scrambler with a plurality of configurations, a plurality of initial state indicators, a scrambler configuration indicator selector to select at least one configuration from said plurality of configurations.

An apparatus may comprise a receiver electrically coupled to a drill string to receive formatted digital data transmitted via multiple waveform modulated electrical current through a rock formation. The receiver may comprise a sensor to receive a superposition of waveforms from the current in the rock formation, a demodulator to estimate transmitted digital values from the superposition of waveforms received by the sensor, and a plurality of transforms to enable transforming the received, estimated digital values. The receiver may further comprise a controller to select at least one transform from said plurality of transforms and to transform the received, estimated digital values into digital data representing data that was acquired by the transmitter.

The receiver may operate to demodulate multiple waveform modulation comprising OFDM or DSSS. The transforms may comprise LSFRs, with the ability to accept at least one initial shift register value from a plurality of possible initial shift register values. One or more configurable LSFRs may be operable to receive a polynomial indicator from a plurality of possible polynomial indicators describing feedback connections.

In some embodiments, a controller operates to select at least one initial shift register value from a plurality of possible initial shift register values, to implement the selection of a transform. The controller may also operate to select at least one polynomial indicator from a plurality of possible polynomial indicators to implement selection of a transform. The initial shift register and polynomial indicator value(s) may be selected at least in part based on said estimated transmitted digital values. Other controller embodiments may employ a plurality of LFSRs configured using a corresponding plurality of polynomial descriptors, corresponding to a plurality of polynomial indicators.

In some receivers, a scrambler may be configured to receive at least one initial state indicator from a plurality of possible initial state indicators, to generate a sequence of numbers and transform said estimated digital values. The associated controller may be configured to select at least one initial state indicator from a plurality of possible initial state indicators used in the transformation of said estimated digital values. The scrambler may be used to generate a sequence of numbers and transform digital data using Galois Field arithmetic.

The controller in a transmitter or a receiver may comprise a digital logic circuit, or a microprocessor circuit, or a microcontroller circuit executing a program. A CRC processing module may be used to provide a CRC value within packets of formatted digital data, as part of the bit-stream. The CRC processing module can operate to check received estimated digital values, and to enable selection of at transformed received estimated digital values from a plurality of transforms.

The CRC processing module may be realized using either hardware and/or software. The CRC processing module uses a sufficient number of bits along with a polynomial descriptor that, when combined, provides decoding error detection to some desired threshold level of accuracy.

In some embodiments, a system may comprise one or more repeaters, each including a transmitter and a receiver. The repeater may relay blindly and/or decode and re-encode digitized data, wherein the re-encoding may or may not use the same modulation coding scheme as the decoding. In the case of re-encoding, the repeater may select its own transform indicator(s) via its own criteria or simply reuse the same SEED and POLY values obtained from the received signal.

In some embodiments, rock formation communication is initiated by selecting a transform from a plurality of transform available at the transmitter, transforming digital data using the selected transform (so as to enable the receiver to perform an error-detection check), and transmitting transformed digital data through the rock formation using a modulated waveform resembling a superposition of multiple waveforms. Communication is completed by receiving a waveform from the rock formation in response to said transmission, demodulating the received waveform in to a plurality of demodulated values, and identifying packet errors by using the plurality of demodulated values, the selected transform, and an error detection code value.

Figure 9:
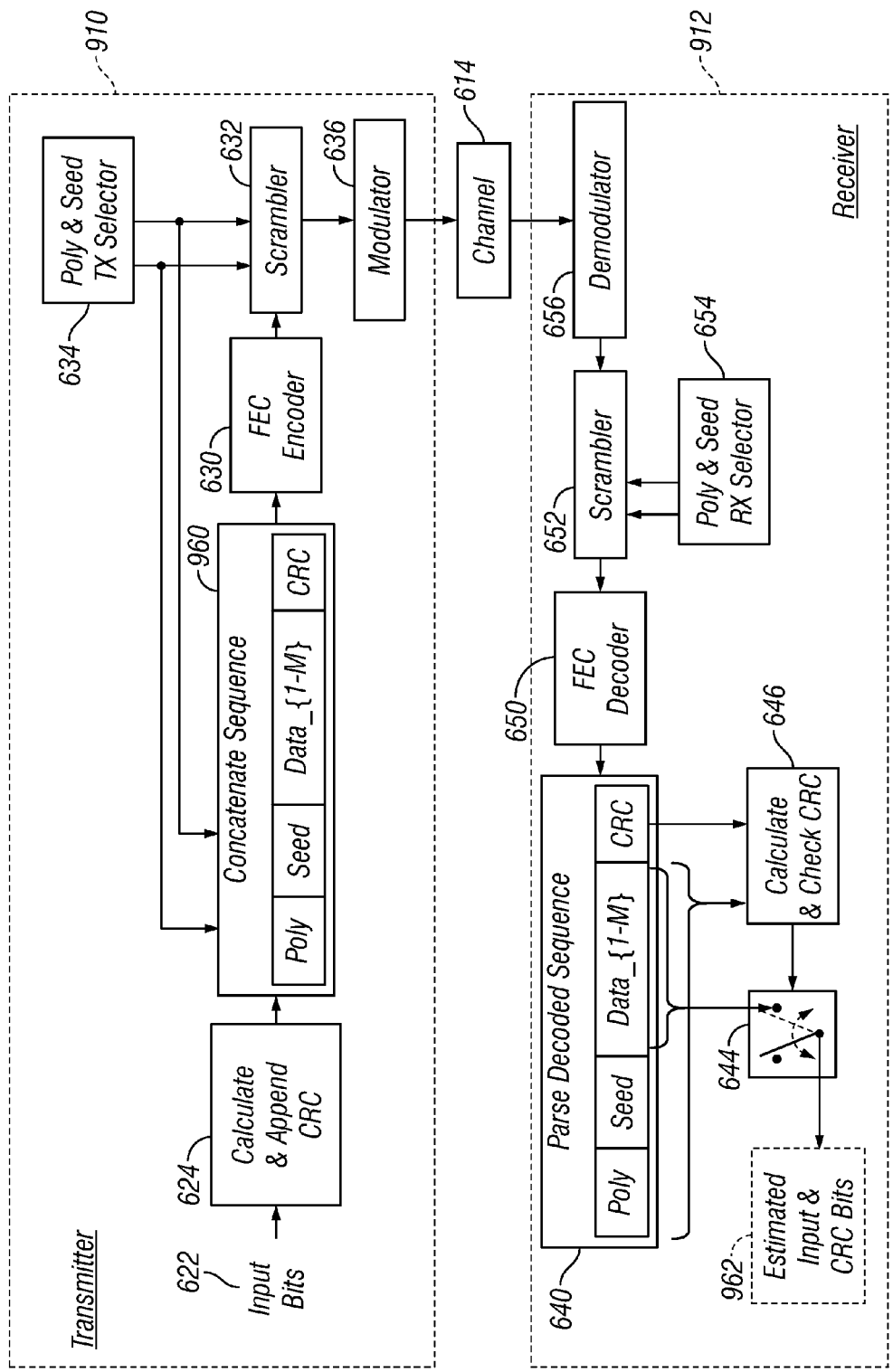
Figure 10:
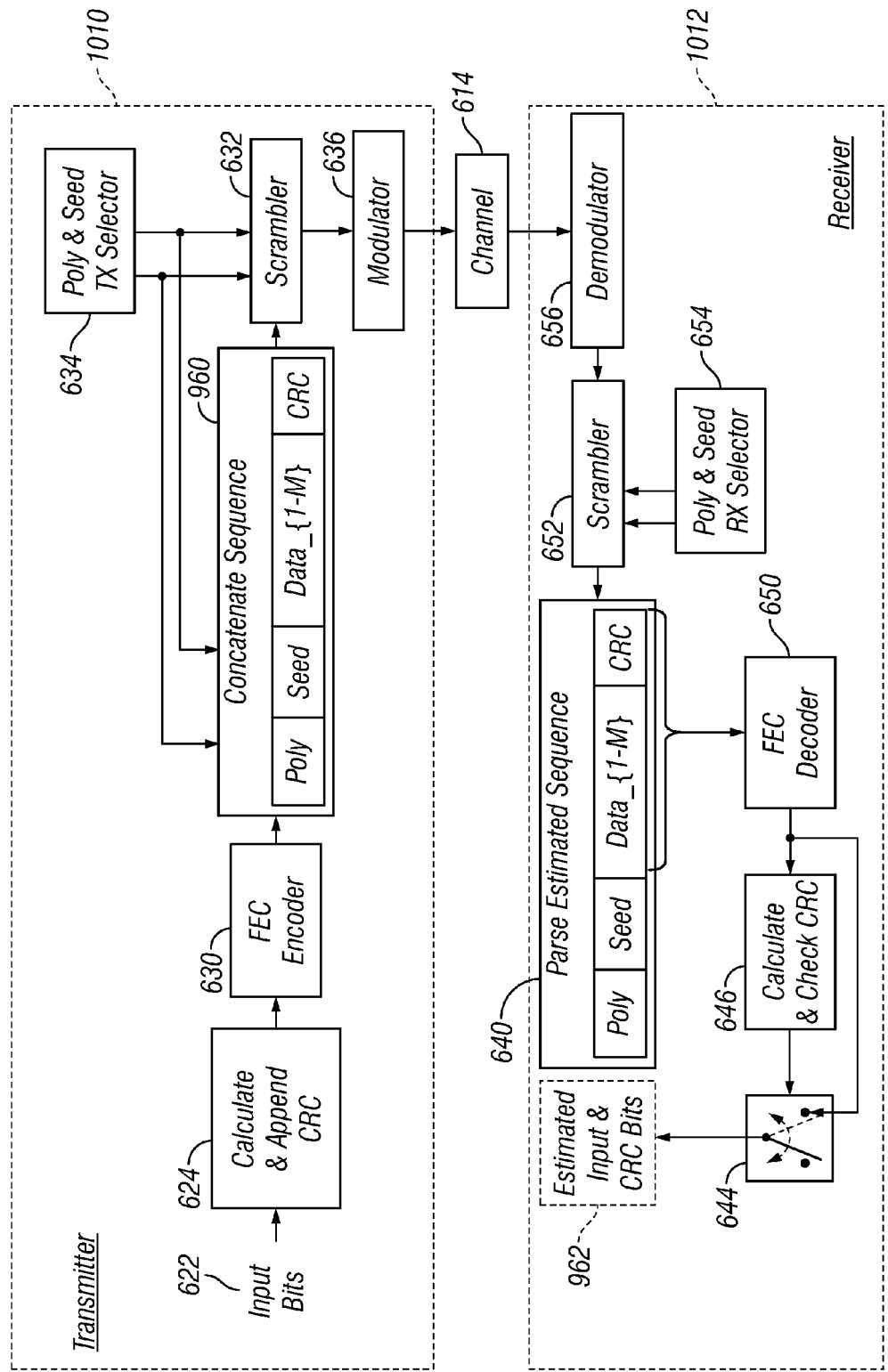

FIG. 9 illustrates a block diagram of a transmitter 910 and receiver 912, according to various embodiments of the invention. FIG. 10 illustrates a block diagram of a transmitter 1010 and receiver 1012, according to various embodiments of the invention. In this case, the order of the components of the transmitter 610 and receiver 612 shown in FIG. 6 have been re-arranged. The location and composition of the concatenated sequence 960 has also been changed. In addition, the estimate provided by the estimator 962 to the selector 644 comprises both estimated acquired data bits and estimated CRC bits. This permits processing the acquired data (e.g., input bits 622) differently than what is available with respect to the arrangements shown in FIGS. 6-8, providing essentially different transmitter/receiver combinations 910, 912 and 1010, 1012. Thus, many embodiments may be realized.

An optimization metric may be calculated, where the controller uses at least one PAPR of a transmitted modulated waveform to select at least one transformation of digital data. The waveform may comprise interpolated samples resulting from at least one interpolation filter connected in series with an amplifier. Optimization may involve use of a predetermined criterion, such as a measure of PAPR for a transmitted modulated waveform, or a characteristic of the filter, to guide transform selection.

Figure 11:
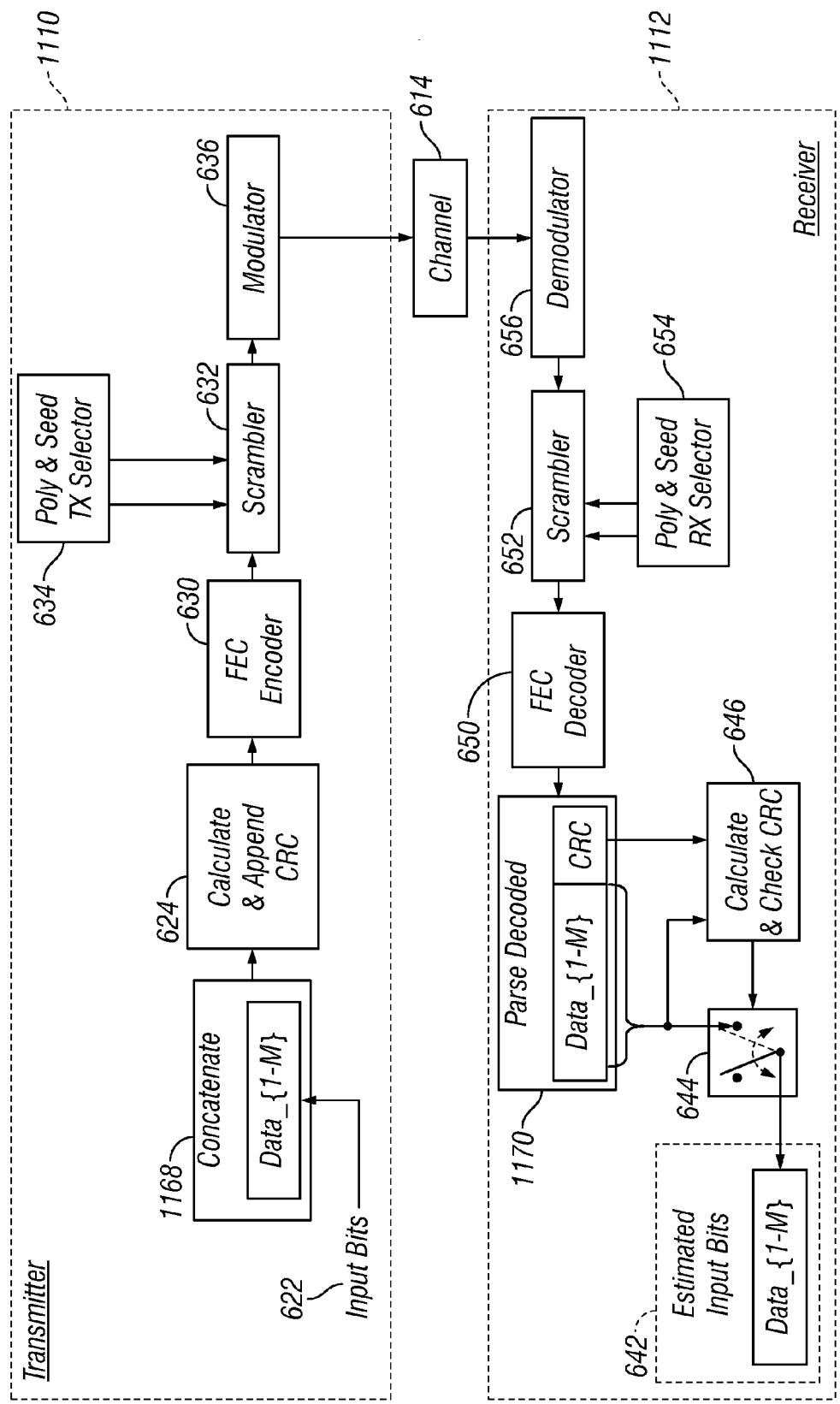
Figure 12:
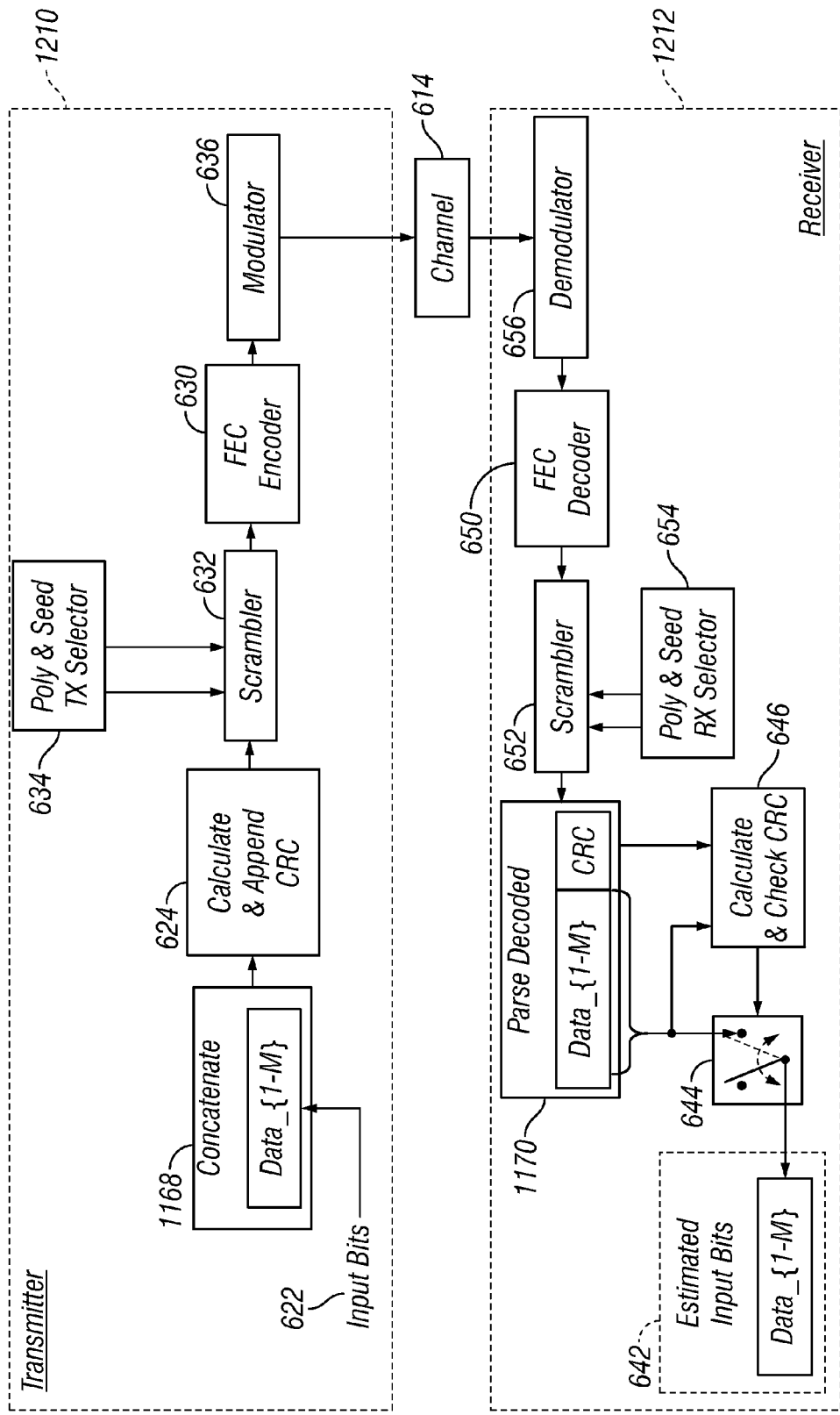
Figure 13:
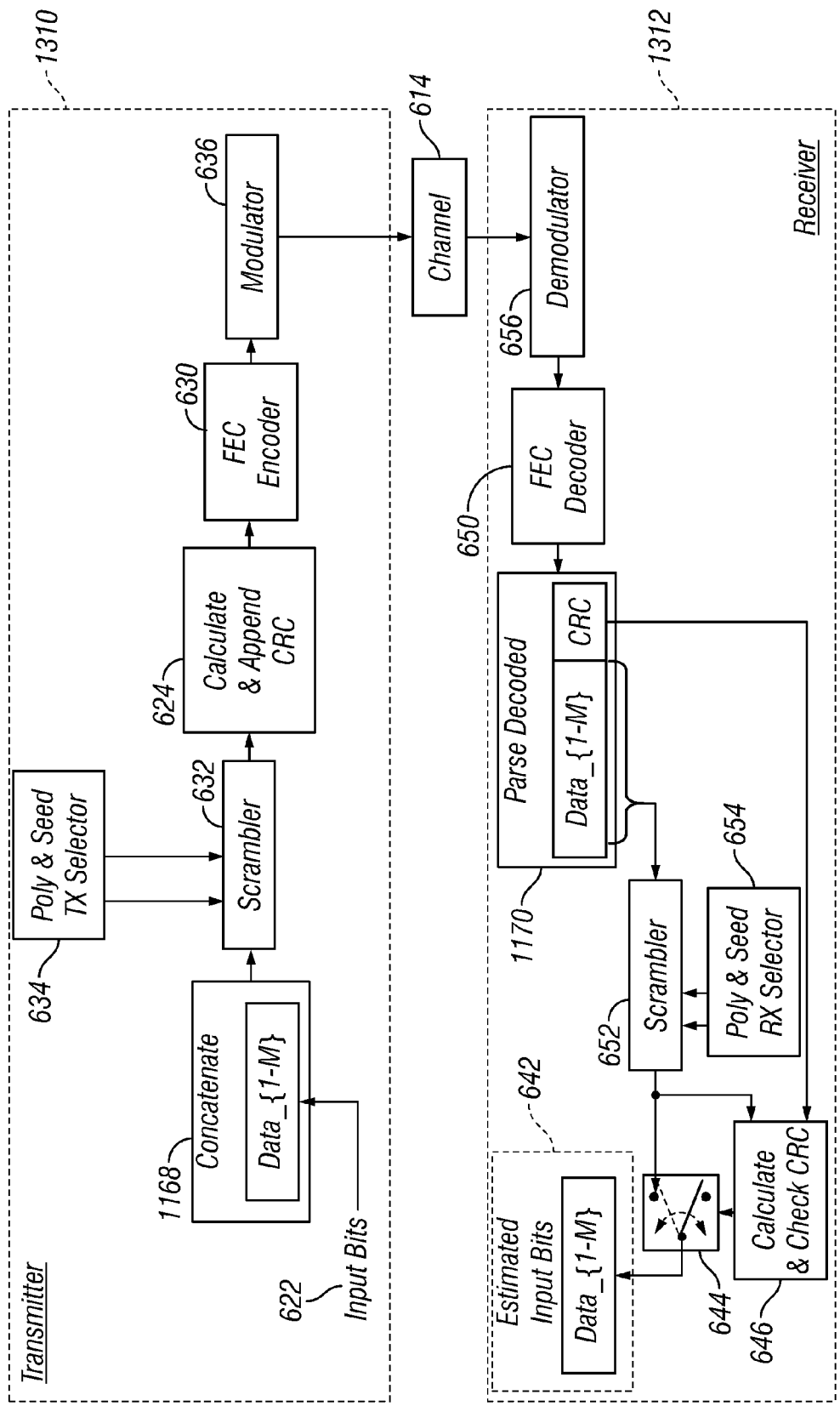

FIG. 11 illustrates a block diagram of a transmitter 1110 and receiver 1112, according to various embodiments of the invention. FIG. 12 illustrates a block diagram of a transmitter 1210 and receiver 1212, according to various embodiments of the invention. FIG. 13 illustrates a block diagram of a transmitter 1310 and receiver 1312, according to various embodiments of the invention.

In this case, the order of the components of the transmitter 610 and receiver 612 shown in FIG. 6 have been re-arranged. The composition of the concatenated sequence 1168 has also been changed, resulting in a change of the composition of the decoded data sequence 1170. This permits processing the acquired data (e.g., input bits 622) differently than what is available with respect to the arrangements shown in FIGS. 6-8, providing essentially different transmitter/receiver combinations 1110, 1112, 1210, 1212, and 1310, 1312. Thus, many embodiments may be realized.

In providing a service to its clients, an oil field services company may practice various embodiments via a method of receiving digital data packets through a rock formation that comprises sensing at least one physical effect caused by the propagation of a superposition of a plurality of waveforms from a multiple waveform modulated electrical current within the rock formation. The method may include demodulating the superposition of the plurality of waveforms into a plurality of numerical values, estimating digital values from said plurality of demodulated numerical values, transforming said estimated digital values using at least one transform selected from a plurality of transforms.

The sensed physical effect may include sending an electrical voltage drop across a distance in the rock formation, due to the current passing through the rock formation. Another physical effect that can be sensed includes changes in magnetic fields observed using magnetometers.

In some embodiments, the estimated digital values may be scrambled using at least one initial state value selected from a plurality of possible initial state values. Polynomial indicators can be selected from a plurality of possible polynomial indicators to configure the scrambler. Initial state values can be selected from a plurality of possible initial state values for this purpose, as well.

The process of selecting an initial state value/indicator, and/or a polynomial indicator may or may not take into account some of the estimated digital values. The receiver may or may not operate to calculate CRC checksums using transformed, estimated digital values to determine whether digital data packets have been correctly received. The receiver may or may not operate to search some or all possible transforms, initial state SEED values/indicators, and/or polynomial indicators POLY to find a CRC value that indicates a correct decoding event, or a checksum indicating a non-error condition.

Figure 14:
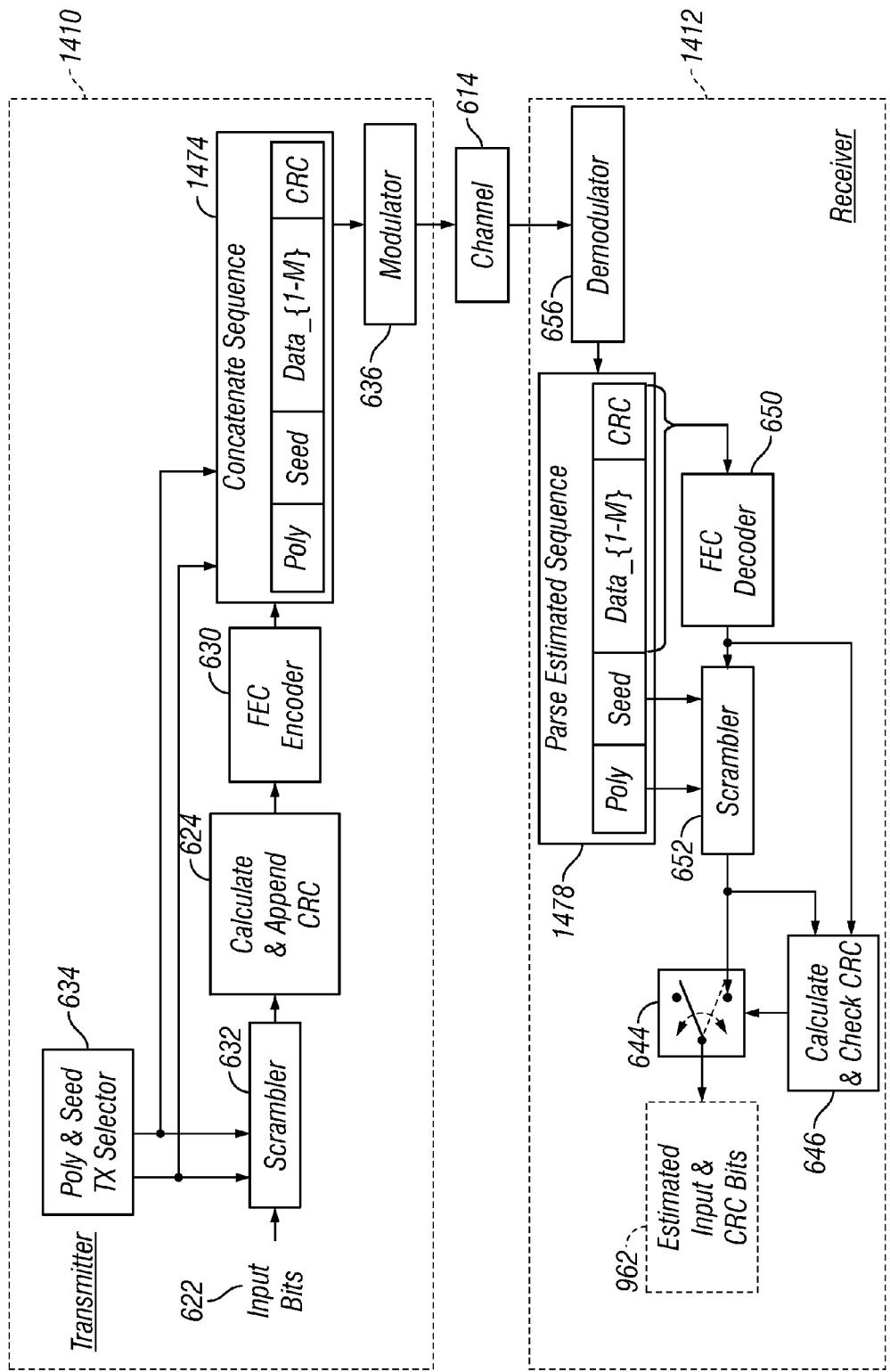
Figure 15:
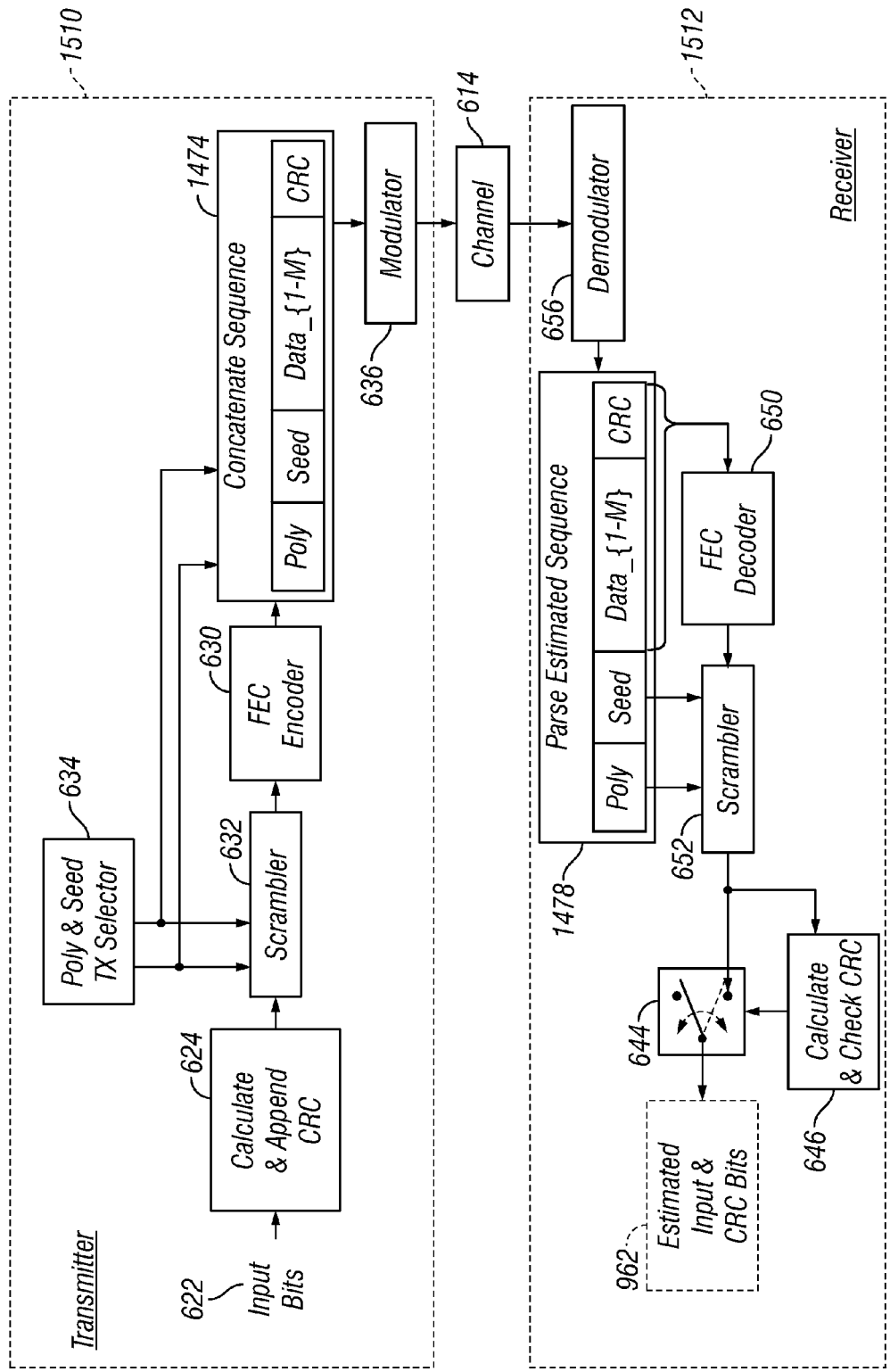
Figure 16:
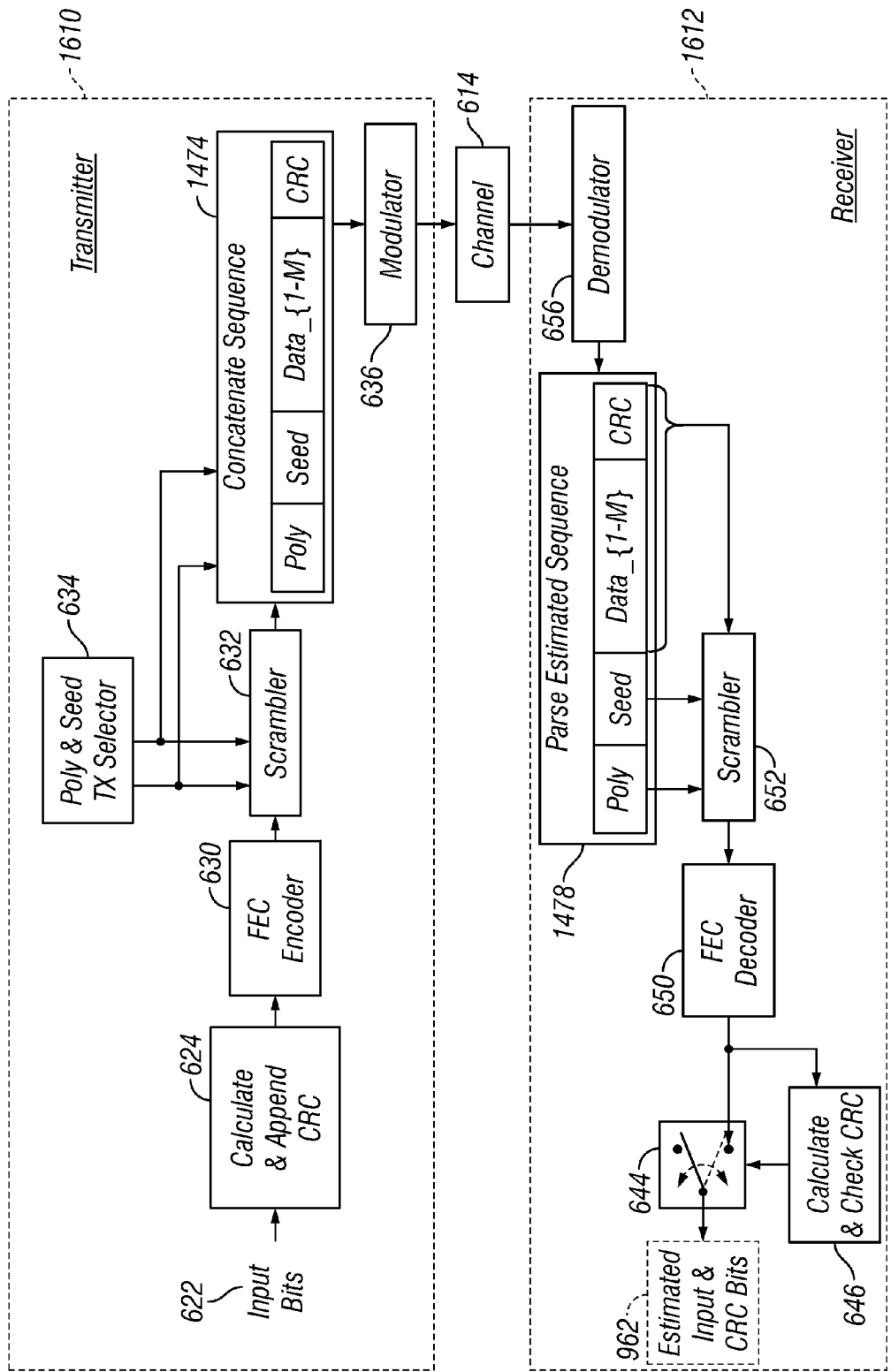

FIG. 14 illustrates a block diagram of a transmitter 1410 and receiver 1412, according to various embodiments of the invention. FIG. 15 illustrates a block diagram of a transmitter 1510 and receiver 1512, according to various embodiments of the invention. FIG. 16 illustrates a block diagram of a transmitter 1610 and receiver 1612, according to various embodiments of the invention.

In this case, the order of the components of the transmitter 610 and receiver 612 shown in FIG. 6 have been re-arranged. The location and composition of the concatenated sequence 1474 has also been changed, resulting in a change of the composition of the decoded data sequence 1478. This permits processing the acquired data (e.g., input bits 622) differently than what is available with respect to the arrangements shown in FIGS. 6-8, providing essentially different transmitter/receiver combinations 1410, 1412, 1510, 1512, and 1610, 1612.

Figure 22:
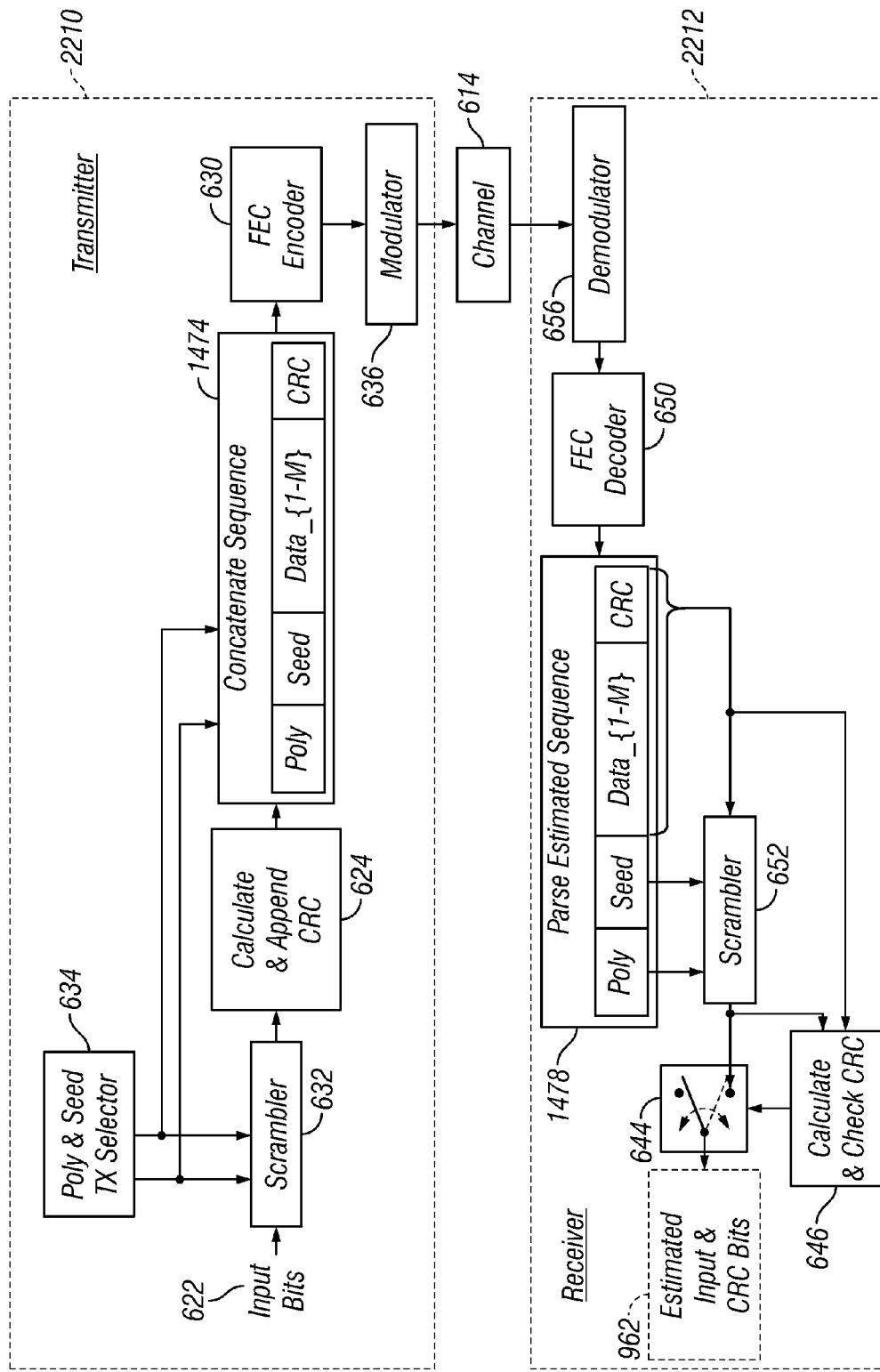
FIGS. 22-24 illustrate additional block diagrams of transmitters and receivers, according to various embodiments of the invention.
Figure 23:
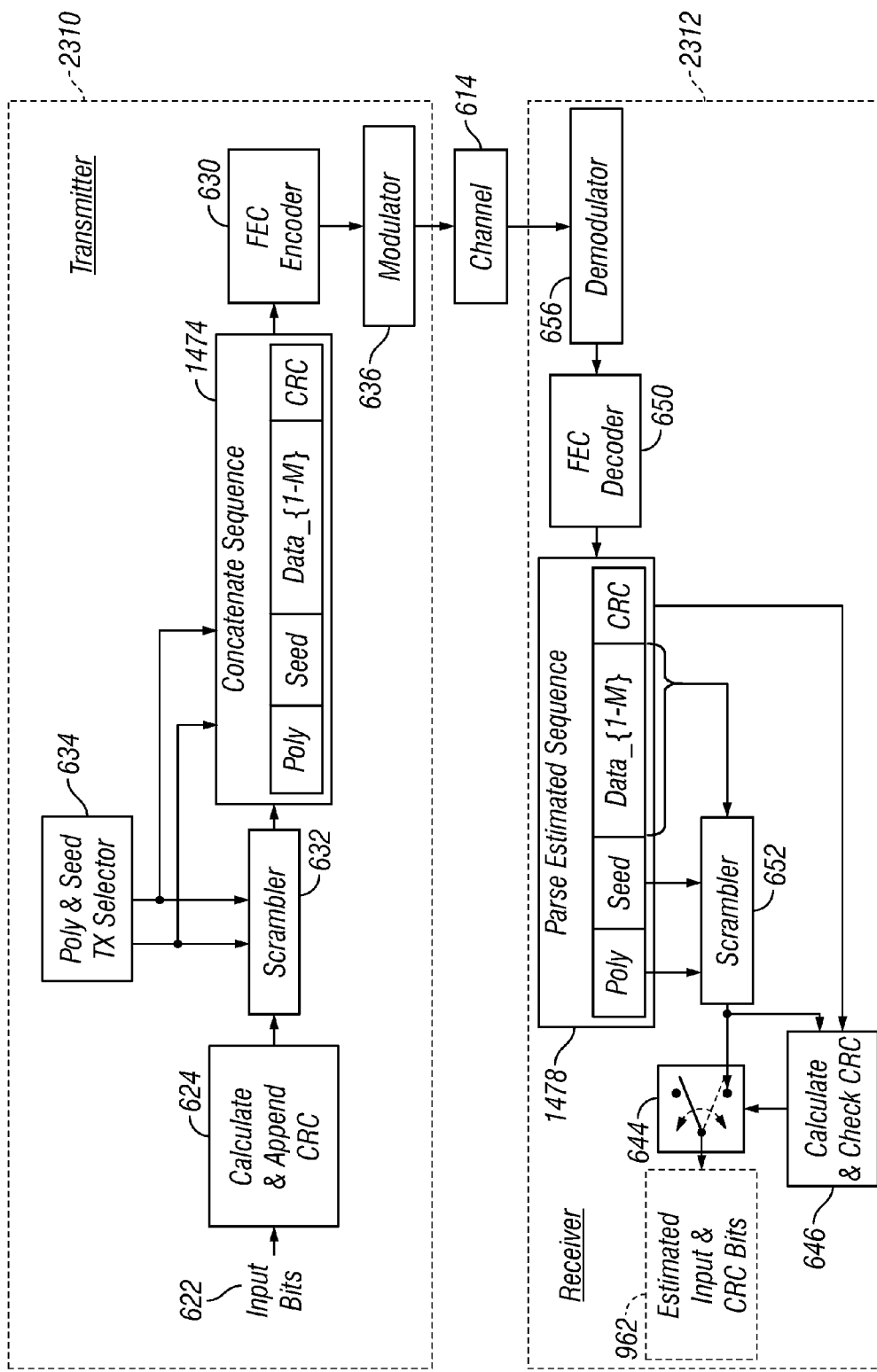
Figure 24:
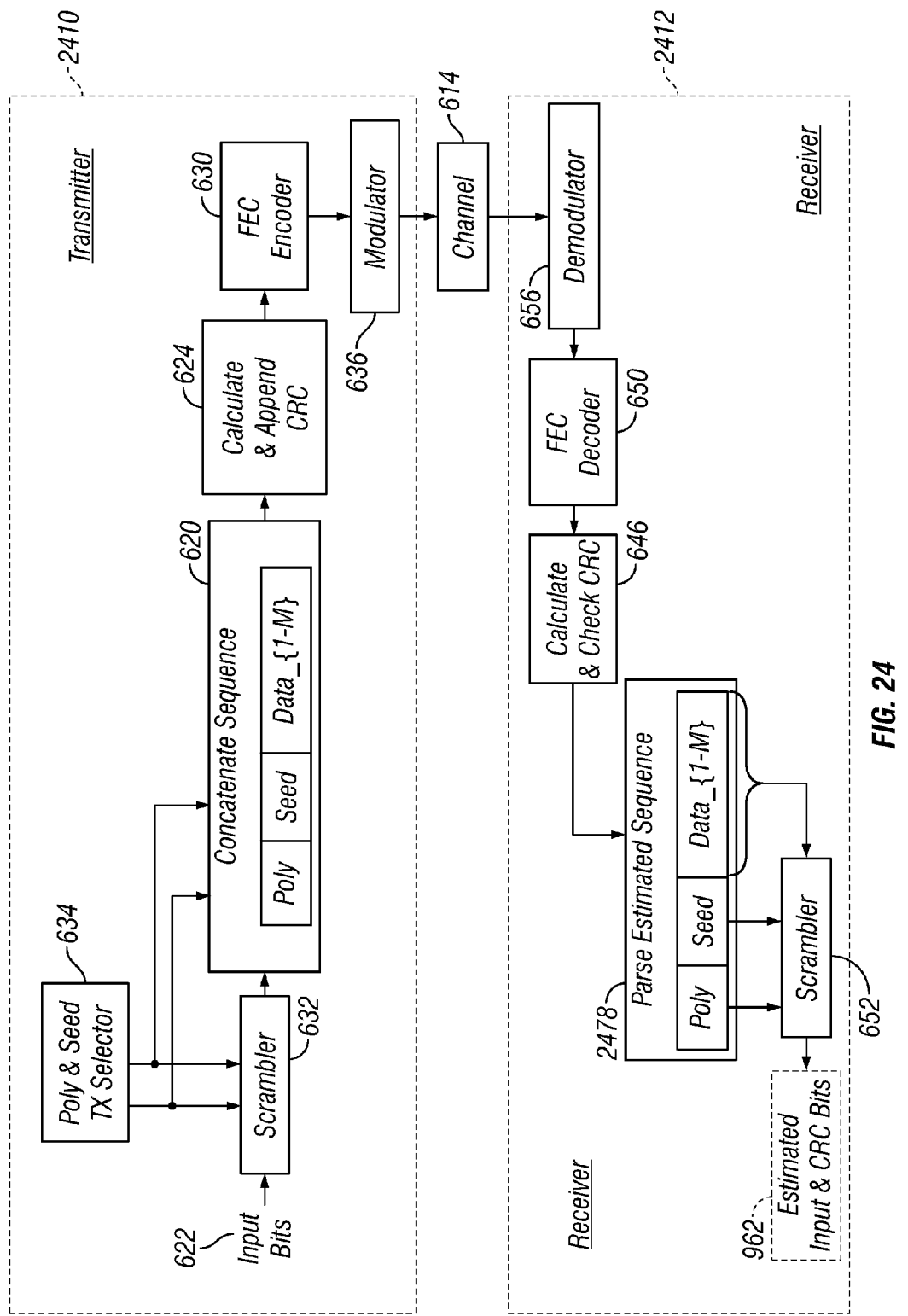

FIGS. 22-24 illustrate block diagrams of transmitters 2210, 2310, 2410 and receivers 2212, 2312, 2412, according to various embodiments of the invention. In this case, the order of the components of the transmitter 1610 and receiver 1612 shown in FIG. 16 have been re-arranged. The location and composition of the concatenated sequence 1474 has also been changed, resulting in a change of the composition of the decoded data sequence 1478 and 2478. This permits processing the acquired data (e.g., input bits 622) differently than what is available with respect to the arrangements shown in FIGS. 14-16, providing essentially different transmitter/receiver combinations 2210, 2212, 2310, 2312, and 2410, 2412. Thus, many embodiments may be realized.

In some embodiments, a method of formatting digital data packets enabling transmission through a rock formation comprises receiving digital data, calculating a CRC using said digital data, calculating optimization metrics for at least one transform and modulation scheme associated with the transmission of electrical current through a rock formation. On or more transformations applied to the digital data may be selected form a plurality of transformations on the basis of the optimization metric calculation results.

The current passing through the rock formation may be modulated by varying a voltage using the transformed data. The optimization metrics may be calculated using at least one initial scrambler state selected from a plurality of possible initial scrambler states. The digital data may be scrambled to produce scrambled data, and the current passing through the rock formation may be modulated by varying a voltage using said scrambled data. In some embodiments, methods may comprise calculating the optimization metrics using the CRC, and generating parity data using a FEC encoder, further comprising calculating the optimization metrics using said parity data.

In some embodiments, transformations are selected using a minimal or minimum optimization metric. In some embodiments, the optimization metric may be calculated using a maximal or maximum metric.

In some embodiments, the optimization metric may be calculated using the transmission time of a formatted packet. In some embodiments, the optimization metric may be calculated using the data rate of the formatted packet, further comprising interpolating said transformed data with a filter, perhaps calculating optimization metrics use at least one characteristic of interpolating filtering. Still more embodiments may be realized.

Figure 17:
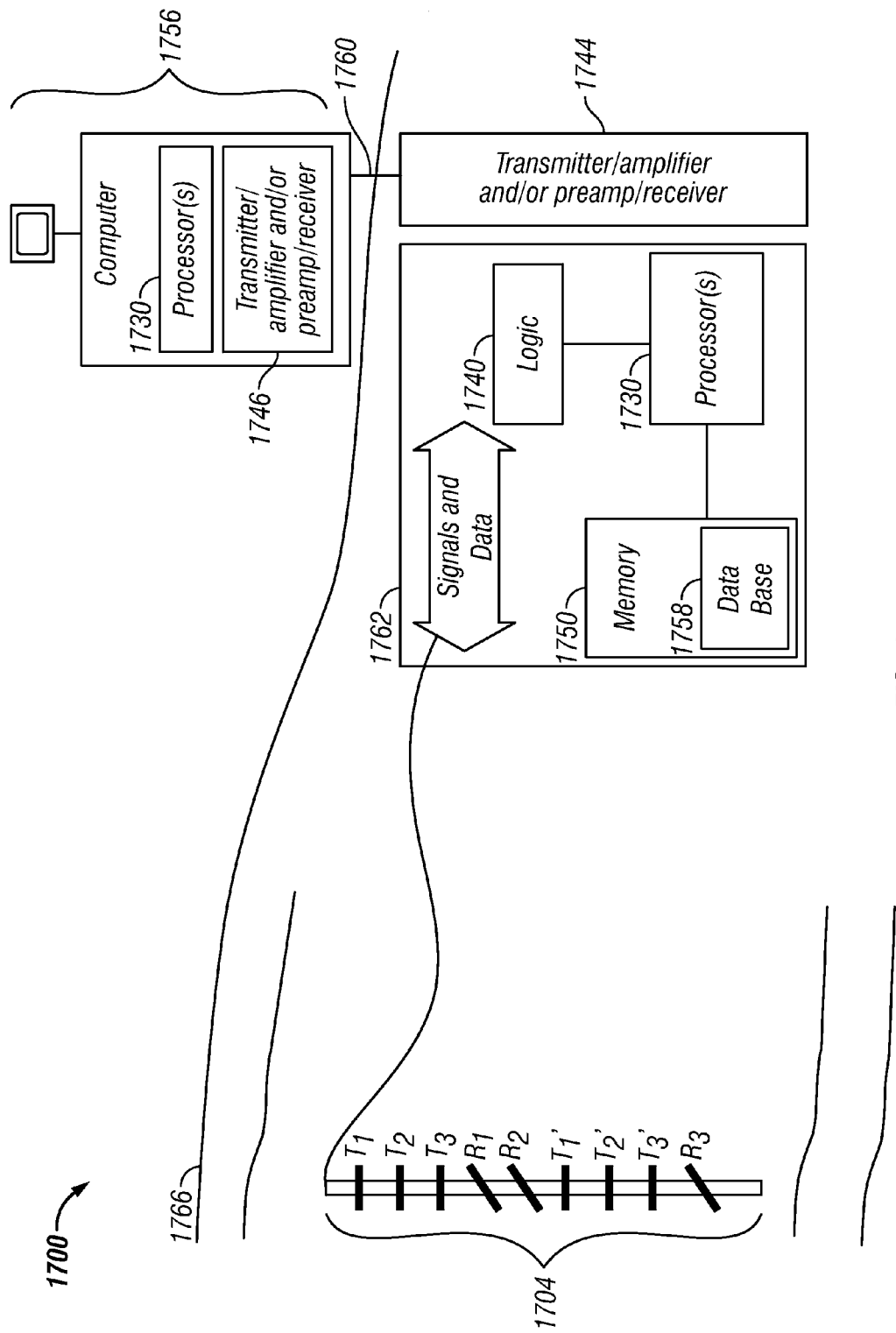
FIG. 17 is a block diagram of apparatus according to various embodiments of the invention.

FIG. 17 is a block diagram of apparatus 1700 according to various embodiments of the invention. The apparatus 1700 may comprise any one or more of the transmitters and/or receivers shown in FIGS. 6-16, and 22-24. Moreover, any one or more of the transmitters and/or receivers shown in FIGS. 6-16, and 22-24 may include scramblers that comprise one or more of the transforms shown in FIG. 1, operating on the bit stream formats shown in FIGS. 2-4, as appropriate.

Any of the transmitters described herein may comprise an interpolation filter and/or an amplifier, to provide an amplified version of the transmitter output signal voltage that results in propagating a current in the geological formation. These components are not shown in many of the drawings so as not to obscure the composition of various embodiments of the invention. Similarly, any of the receivers described herein may comprise one or more preamplifiers and/or reception filters that provide amplified, filtered data to a demodulator. These components are also not shown in many of the drawings so as not to obscure the composition of various embodiments of the invention.

In many embodiments, the apparatus 1700 comprises a combination of downhole instrumentation T, R, such as acoustic transmitters $T_1$-$T_1'$, $T_2$-$T_2'$ and $T_3$-$T_3'$ and acoustic receivers R1, R2, and R3, attached to a drill string 1704. The instrumentation T, R may also comprise other kinds of instruments, such as magnetometers, electromagnetic transmitters/receivers, etc.

The apparatus 1700 may also include hardware logic 1740 and/or one or more processors 1730, perhaps comprising a programmable drive and/or sampling control system. The logic 1740 can be used to acquire formation data, such as resisitivity. The data can be stored in a memory 1750, perhaps using a database 1758.

A data transmitter and/or receiver 1744 (equivalent to or identical to the transmitters and/or receivers of FIGS. 6-16, and 22-24) can be used to communicate with a surface 1766 data processing system 1756, via a second transmitter and/or receiver 1746 (which may also be equivalent to or identical to the transmitters and/or receivers shown in FIGS. 6-16, and 22-24). Thus, the apparatus 1700 may further comprise a data transmitter 1744 (e.g., a telemetry transmitter or transceiver) to transmit boundary distance and resistivity formation parameters to a surface data processing system 1756. The communication may occur via a number of channels 1760, such as the drill string, the drilling mud, the well casing, and/or the geological formation surrounding the well casing. Some embodiments may include systems comprising multiple instances of the apparatus 1700. For example, such systems may include one or more transmitters and/or receivers 1744 below the surface 1766, and/or one or more transmitters and/or receivers 1746 above the surface 1766. Thus, many embodiments may be realized.

For example, in the case of EMT, a MWD service provider may use an electrical transmitting tool serially connected to the drill-string 1704 to place a time-varying voltage potential across an insulator, such as a ceramic spacer. The spacer may be located serially in the drill string 1704 to electrically isolate the bit from the drill-string 1704 attached to the surface rig, so as to produce time-varying electrical currents in the surrounding rock formations. On the uplink connection (e.g., using channel 1760), the downhole electrical tool varies the voltage across this insulator and thus varies the current fields in the rock formation. A surface system receiver (e.g., receiver 1746) observes one or more voltage drops or magnetic changes (e.g., using magnetometers) across distances at the surface 1766, between the drill-string 1704 and spatially separated grounding spikes. The current used to communicate information may comprise any of the currents described herein.

If two-way communication is desired, a downlink connection (e.g., using channel 1760) transmits information from the surface rig to the down-hole electrical tool. The surface system 1756 may use the potential across at least one distance at the surface 1766, perhaps using the same set of grounding spikes and the drill string used for reception of the uplink information. Thus, the down-hole electrical tool is capable of receiving a signal by observing the potential across the insulating spacer. Thus, additional embodiments may be realized.

For example, referring now to FIGS. 1-17, it can be seen that an apparatus 1700 may comprise a scrambler module to transform acquired data into transformed data using at least one transform selected from a plurality of transforms according to an optimization metric calculation that operates on single, fixed-length packets of the transformed data and/or received data corresponding to the transformed data, and a preselected quality criterion threshold. The apparatus 1700 may comprise an amplifier to receive an electrical signal including the transformed data, and to produce an amplified version of the electrical signal in a geological formation via a drill string.

In some embodiments, the apparatus 1700 may comprise an LFSR configurable to accomplish the at least one transform using at least one of a selectable initial SEED value or a selectable polynomial indicator POLY. The apparatus 1700 may comprise a modulator to provide the electrical signal by operating on the transformed data using OFDM or DSSS modulation. The apparatus 1700 may comprise a CRC processing module to generate a cyclic redundancy check value to be included in the transformed data or the electrical signal.

In some embodiments, the apparatus 1700 may comprise an interpolation filter to operate on the transformed data. The interpolation filter may be located between the modulator and the amplifier, for example. The apparatus 1700 may further comprise a portion of the drill string 1704 to house the scrambler module and the amplifier. Thus, any of the components of a down-hole tool 1762 may be housed by or attached to the drill string 1704.

The apparatus 1700 may also comprise reception apparatus. For example, an apparatus 1700 may comprise a sensor (e.g., a preamplifier and/or filter) to receive an amplified version of an electrical signal in a geological formation. The apparatus 1700 may further comprise a descrambler module to transform the electrical signal including transformed data into an estimated version of acquired data using at least one transform defined by at least one of a seed value or a polynomial indicator. The at least one transform may be selected from a plurality of transforms according to an optimization metric calculation that operates on single, fixed-length packets of the transformed data and/or the estimated version, and a preselected quality criterion threshold. The preselected quality criterion threshold may be based on at least one of a PAPR of the electrical signal, the transformed data, or an error rate of the estimated version.

The apparatus 1700 may further comprise a shift register (e.g., an LFSR) configurable to accomplish the at least one transform using at least one of an initial seed value SEED or a polynomial indicator POLY contained in the electrical signal.

In some embodiments, the apparatus 1700 is electrically coupled to a drill string. The apparatus 1700 can be used to produce an electrical current that propagates through a rock formation, and comprises a power source, an amplifier electrically connected to the power source, the amplifier capable of pulsing an adjustable voltage output to produce changes in electrical current pulsing through the rock formation. The apparatus 1700 further comprises a plurality of transforms that are used to format digital data in packets. A controller (e.g., a hardware processor) in the apparatus 1700 enables the amplifier to create a plurality of changes in electrical current passing through said rock formation, the current comprising multiple waveform modulation, wherein the controller formats the digital data into packets using a transform selected from said plurality of transforms.

The multiple waveform modulation may comprise OFDM or DSSS modulation. The plurality of transforms may comprise one or more LFSRs configured to accept at least one initial shift register value from a plurality of possible initial shift register values. The plurality of transforms may comprise one or more configurable LSFRs to receive a polynomial indicator from a plurality of possible polynomial indicators describing feedback connections.

The controller may operate to calculate one or more optimization metrics relating to a predetermined criterion threshold for at least one transform within the plurality of transforms. A memory in the apparatus 1700 may be used to store one or more optimization metrics determined by the predetermined criterion threshold.

The controller may operate to select a transform from said plurality of transforms corresponding to a minimal or a minimum optimization metric. Similarly, the controller may operate to select a transform from said plurality of transforms corresponding to a maximal or a maximum optimization metric. The optimization metric may be the estimated probability of receiving the packet in error, or of receiving the packet correctly. The apparatus may further comprise a CRC processing module enabling said controller to include a CRC value within the packets of formatted digital data.

In some embodiments, the apparatus 1700 comprises a scrambler enabled to receive at least one initial state indicator from a plurality of possible initial state indicators, to generate a sequence of numbers and transform digital data using Galois Field arithmetic. The apparatus 1700 may further comprise a controller enabling the amplifier to create a plurality of changes in electrical current passing through a rock formation resembling a multiple waveform modulation, wherein the controller optimizes using a predefined criterion that enables the scrambler to transform digital data into packets using an initial state indicator selected from said plurality of possible initial state indicators.

Calculating at least one optimization metric by the controller may use at least one PAPR of a transmitted modulated waveform corresponding to at least one transformation of the digital data. The predetermined criterion may thus include a measure of PAPR of a transmitted modulated waveform.

The apparatus 1700 may comprise at least one interpolation filter in series with the amplifier. The controller may optimize using at least one characteristic of the filter in the transform selection.

The apparatus 1700 may include a transform selector capable of selecting at least one transform from a plurality of transforms such that the modulated output voltage of the amplifier of at least one packet of transformed digital values avoids non-linear distortion after processing by an interpolation filter, and the selected transform enables error detection at the receiver.

The apparatus 1700 may comprise an initial state indicator selector capable of selecting at least one initial state indicator from a plurality of initial state indicators such that the modulated voltage of at least one packet of transformed digital values avoids non-linear distortion after processing by an interpolation filter, wherein said selected transform enables error detection at the receiver.

In some embodiments, the apparatus 1700 electrically connected with a drill string may be configured to receive formatted digital data transmitted via multiple waveform modulated electrical current through a rock formation. The apparatus 1700 may comprise a sensor enabling the reception of a superposition of waveforms from said multiple waveform modulated electrical current within said rock formation, a demodulator enabling the estimation of said transmitted digital values from said superposition of waveforms received by said sensor, a plurality of transforms enabling at least one transformation of said received estimated digital values, and a controller (e.g., comprising processing hardware, such as a microprocessor or a digital signal processor) to select at least one transform from said plurality of transforms and transform received estimated digital values.

The plurality of transforms may comprise at least one LFSR configured to accept at least one initial shift register value from a plurality of possible initial shift register values and/or to receive a polynomial indicator from a plurality of possible polynomial indicators describing feedback connections.

The controller may operate to select at least one initial shift register value from a plurality of possible initial shift register values, enabling said transform selection. The controller may operate to select at least one polynomial indicator from a plurality of possible polynomial indicators enabling said transform selection.

The controller may operate to select selects said selected initial shift register value and/or said selected polynomial indicator at least in part based on said estimated transmitted digital values. The controller may employ a plurality of LFSRs configured using a plurality of polynomial descriptors, respectively, corresponding to a plurality of polynomial indicators, also respectively.

The apparatus 1700 may comprise a CRC processing module enabling the checking of at least one check value of said received estimated digital values wherein said module also enables selection of transformed received estimated digital values from said plurality of transforms.

The apparatus 1700 may further comprise a scrambler to receive at least one initial state indicator from a plurality of possible initial state indicators, to generate a sequence of numbers and transform said estimated digital values, and a controller to select at least one initial state indicator from said plurality of possible initial state indicators used in the transformation of said estimated digital values. The scrambler may be configurable by receiving at least one polynomial indicator from a plurality of possible polynomial indicators describing the configuration of the scrambler and at least one initial state indicator from a plurality of possible initial state indicators, to generate a sequence of numbers and transform said estimated digital values in response to receiving a polynomial indicator and an initial state indicator.

Some embodiments may comprise a system of multiple apparatus 1700—some of the apparatus 1700 operating as a transmitter, and some of the apparatus 1700 operating as a receiver. Such systems may operate as a transceiver and/or a repeater, as described previously.

Thus, a system to communicate through a rock formation may comprise a transmitter to modulate a current through a rock formation resembling the superposition of a plurality of waveforms. The system may further comprise a plurality of transforms accessible by said transmitter enabling the transformation of digital data. A receiver may be included in the system, the receiver operating to demodulate, to select a transform from a plurality of transforms accessible by the receiver, and to transform said transformed digital data using an error detection code to determine the digital data within at least one packet.

Figure 18:
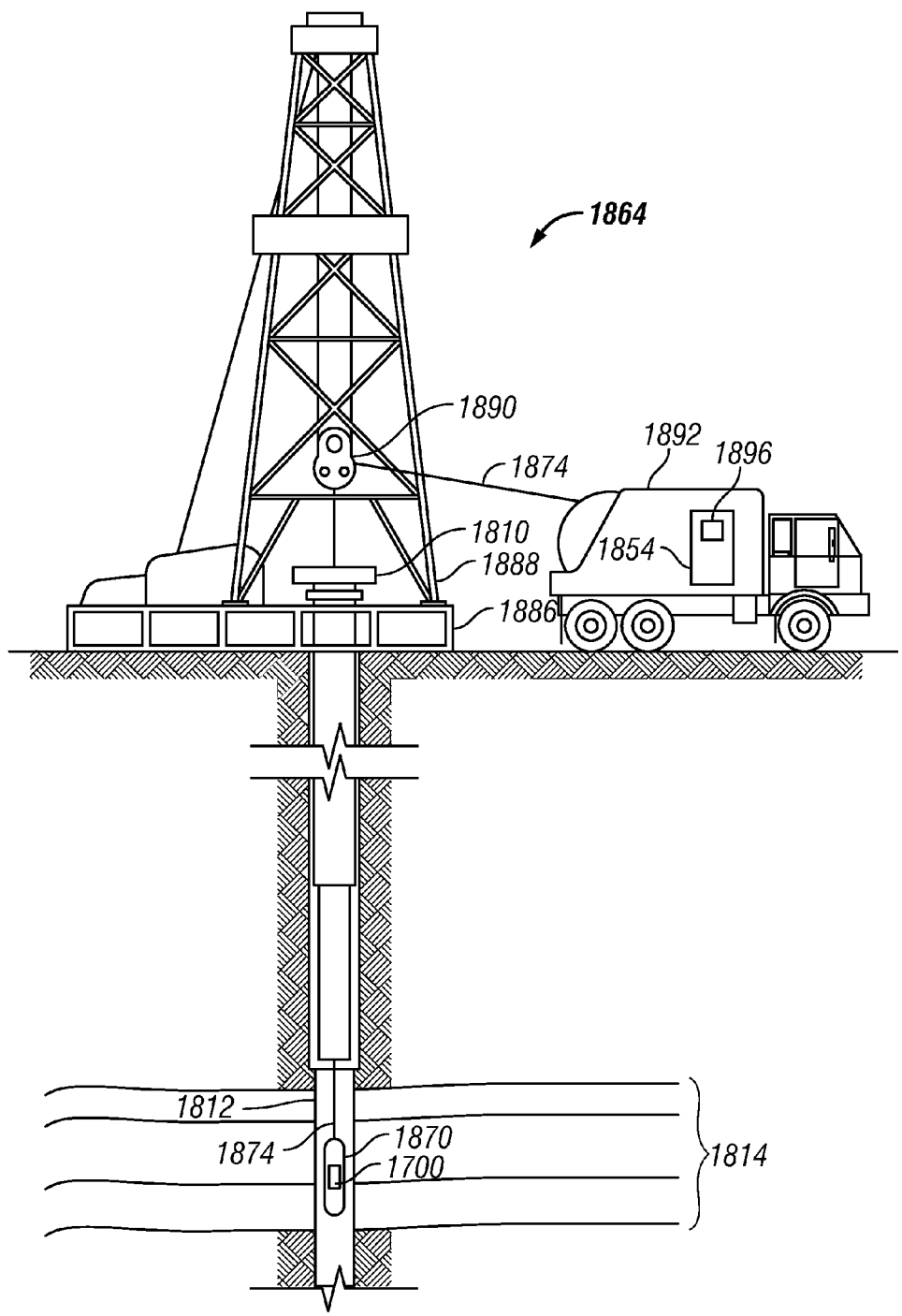
FIG. 18 illustrates a wireline system embodiment of the invention.
Figure 19:
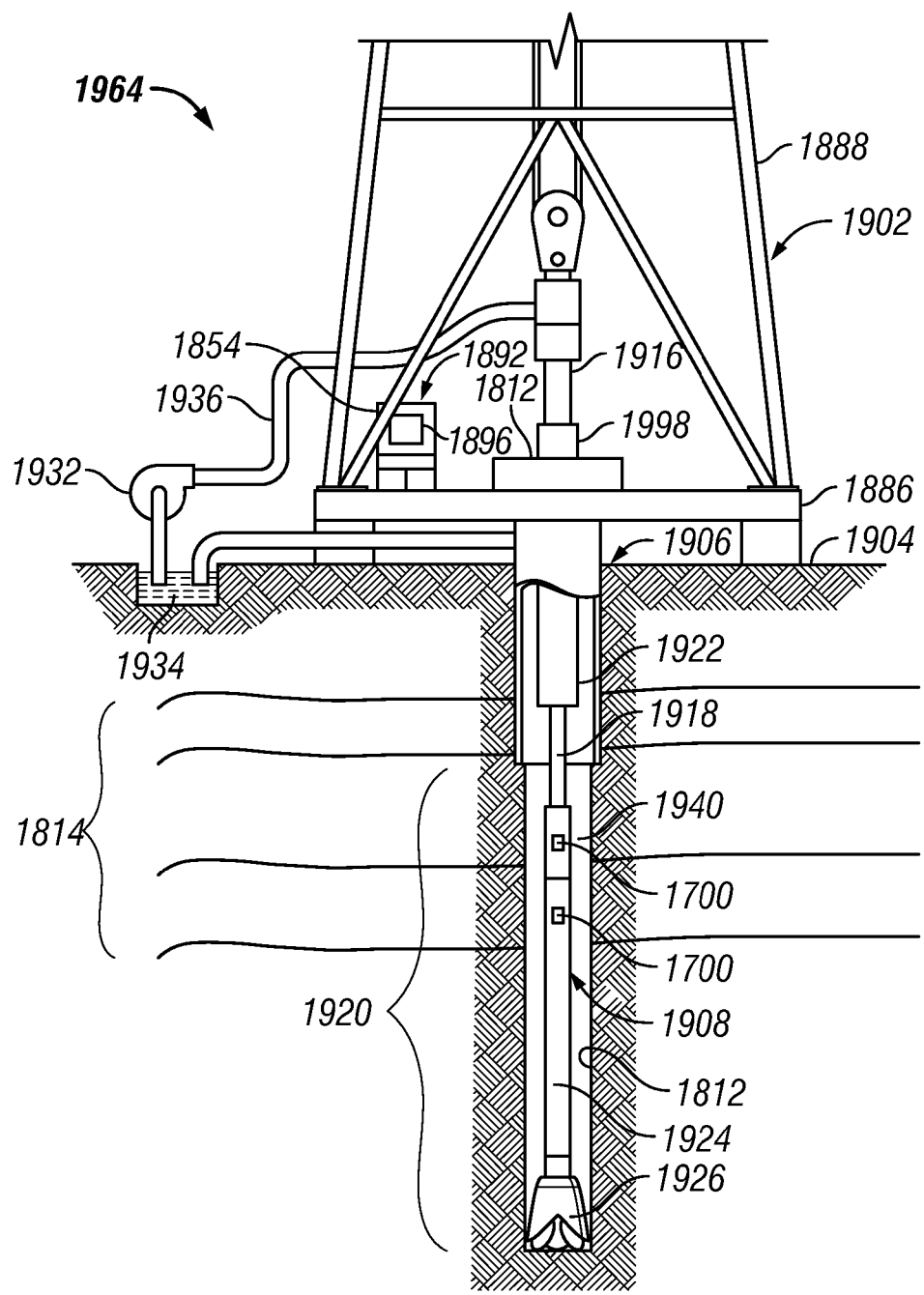
FIG. 19 illustrates a drilling rig system embodiment of the invention.

FIG. 18 illustrates a wireline system 1864 embodiment of the invention. FIG. 19 illustrates a drilling rig system 1964 embodiment of the invention. Thus, the systems 1864, 1964 may comprise portions of a tool body 1870 as part of a wireline logging operation, or of a downhole tool 1924 as part of a downhole drilling operation. FIG. 18 shows a well during wireline logging operations. A drilling platform 1886 is equipped with a derrick 1888 that supports a hoist 1890.

Drilling of oil and gas wells is commonly carried out using a string of drill pipes connected together so as to form a drilling string that is lowered through a rotary table 1810 into a wellbore or borehole 1812. Here it is assumed that the drilling string has been temporarily removed from the borehole 1812 to allow a wireline logging tool body 1870, such as a probe or sonde, to be lowered by wireline or logging cable 1874 into the borehole 1812. Typically, the tool body 1870 is lowered to the bottom of the region of interest and subsequently pulled upward at a substantially constant speed.

During the upward trip, at a series of depths the instruments (e.g., the instruments T, R shown in FIG. 1700)

included in the tool body 1870 may be used to perform measurements on the subsurface geological formations 1814 adjacent the borehole 1812 (and the tool body 1870). The measurement data can be communicated to a surface logging facility 1892 for storage, processing, and analysis. Communication of the data may occur using any of the apparatus 1700 described herein. The logging facility 1892 may be provided with electronic equipment for various types of signal processing, which may be implemented by any one or more of the components of the apparatus 1700 in FIG. 1700. Similar formation evaluation data may be gathered and analyzed during drilling operations (e.g., during LWD operations, and by extension, sampling while drilling).

In some embodiments, the tool body 1870 comprises a formation resistivity tool for obtaining and analyzing resistivity measurements from a subterranean formation through a wellbore. The formation resistivity tool is suspended in the wellbore by a wireline cable 1874 that connects the tool to a surface control unit (e.g., comprising a workstation 1854). The formation resistivity tool may be deployed in the wellbore on coiled tubing, jointed drill pipe, hard wired drill pipe, or any other suitable deployment technique.

Turning now to FIG. 19, it can be seen how a system 1964 may also form a portion of a drilling rig 1902 located at the surface 1904 of a well 1906. The drilling rig 1902 may provide support for a drill string 1908. The drill string 1908 may operate to penetrate a rotary table 1810 for drilling a borehole 1812 through subsurface formations 1814. The drill string 1908 may include a Kelly 1916, drill pipe 1918, and a bottom hole assembly 1920, perhaps located at the lower portion of the drill pipe 1918.

The bottom hole assembly 1920 may include drill collars 1922, a downhole tool 1924, and a drill bit 1926. The drill bit 1926 may operate to create a borehole 1812 by penetrating the surface 1904 and subsurface formations 1814. The downhole tool 1924 may comprise any of a number of different types of tools including MWD (measurement while drilling) tools, LWD tools, and others.

During drilling operations, the drill string 1908 (perhaps including the Kelly 1916, the drill pipe 1918, and the bottom hole assembly 1920) may be rotated by the rotary table 1810. In addition to, or alternatively, the bottom hole assembly 1920 may also be rotated by a motor (e.g., a mud motor) that is located downhole. The drill collars 1922 may be used to add weight to the drill bit 1926. The drill collars 1922 may also operate to stiffen the bottom hole assembly 1920, allowing the bottom hole assembly 1920 to transfer the added weight to the drill bit 1926, and in turn, to assist the drill bit 1926 in penetrating the surface 1904 and subsurface formations 1814.

During drilling operations, a mud pump 1932 may pump drilling fluid (sometimes known by those of skill in the art as "drilling mud") from a mud pit 1934 through a hose 1936 into the drill pipe 1918 and down to the drill bit 1926. The drilling fluid can flow out from the drill bit 1926 and be returned to the surface 1904 through an annular area 1940 between the drill pipe 1918 and the sides of the borehole 1812. The drilling fluid may then be returned to the mud pit 1934, where such fluid is filtered. In some embodiments, the drilling fluid can be used to cool the drill bit 1926, as well as to provide lubrication for the drill bit 1926 during drilling operations. Additionally, the drilling fluid may be used to remove subsurface formation 1814 cuttings created by operating the drill bit 1926.

Thus, referring now to FIGS. 1-19, it may be seen that in some embodiments, the systems 1864, 1964 may include a drill collar 1922, a downhole tool 1924, and/or a wireline logging tool body 1870 to house one or more apparatus 1700, similar to or identical to the apparatus 1700 described above and illustrated in FIG. 17. Additional apparatus 1700 may be included in a surface processing facility, such as the workstation 1854. Thus, for the purposes of this document, the term "housing" may include any one or more of a drill collar 1922, a downhole tool apparatus 1924, and a wireline logging tool body 1870 (all having an outer wall, to enclose or attach to instrumentation, sensors, fluid sampling devices, pressure measurement devices, transmitters, receivers, and data acquisition systems). The apparatus 1700 may comprise a downhole tool, such as an LWD tool or MWD tool. The tool body 1870 may comprise a wireline logging tool, including a probe or sonde, for example, coupled to a logging cable 1874. Many embodiments may thus be realized.

For example, in some embodiments, a system 1864, 1964 may include a display 1896 to present resistivity information, both measured and predicted, as well as database information, perhaps in graphic form. A system 1864, 1964 may also include computation logic, perhaps as part of a surface logging facility 1892, or a computer workstation 1854, to receive signals from transmitters and receivers, and other instrumentation to determine the distance to boundaries in the formation 1814.

Thus, a system 1864, 1964 may comprise a downhole tool 1924, and one or more apparatus 1700 attached to the downhole tool 1924, the apparatus 1700 to be constructed and operated as described previously. Additional apparatus 1700 may be included at the surface, perhaps in the workstation 1854. In some embodiments, the downhole tool 1924 comprises one of a wireline tool or an MWD tool.

The apparatus 1700, and any components included therein may all be characterized as "modules" herein. Such modules may include hardware circuitry, and/or a processor and/or memory circuits, software program modules and objects, and/or firmware, and combinations thereof, as desired by the architect of the apparatus 1700 and systems 1864, 1964 and as appropriate for particular implementations of various embodiments. For example, in some embodiments, such modules may be included in an apparatus and/or system operation simulation package, such as a software electrical signal simulation package, a power usage and distribution simulation package, a power/heat dissipation simulation package, and/or a combination of software and hardware used to simulate the operation of various potential embodiments.

It should also be understood that the apparatus and systems of various embodiments can be used in applications other than for logging operations, and thus, various embodiments are not to be so limited. The illustrations of apparatus 1700 and systems 1864, 1964 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, processor modules, embedded processors, data switches, and application-specific modules. Such apparatus and systems may further be included as sub-components within a variety of electronic systems, such as televisions, cellular telephones, personal computers, workstations, radios, video players, vehicles, signal processing for geothermal tools and smart transducer interface node telemetry systems, among others. Some embodiments include a number of methods.

Figure 20:
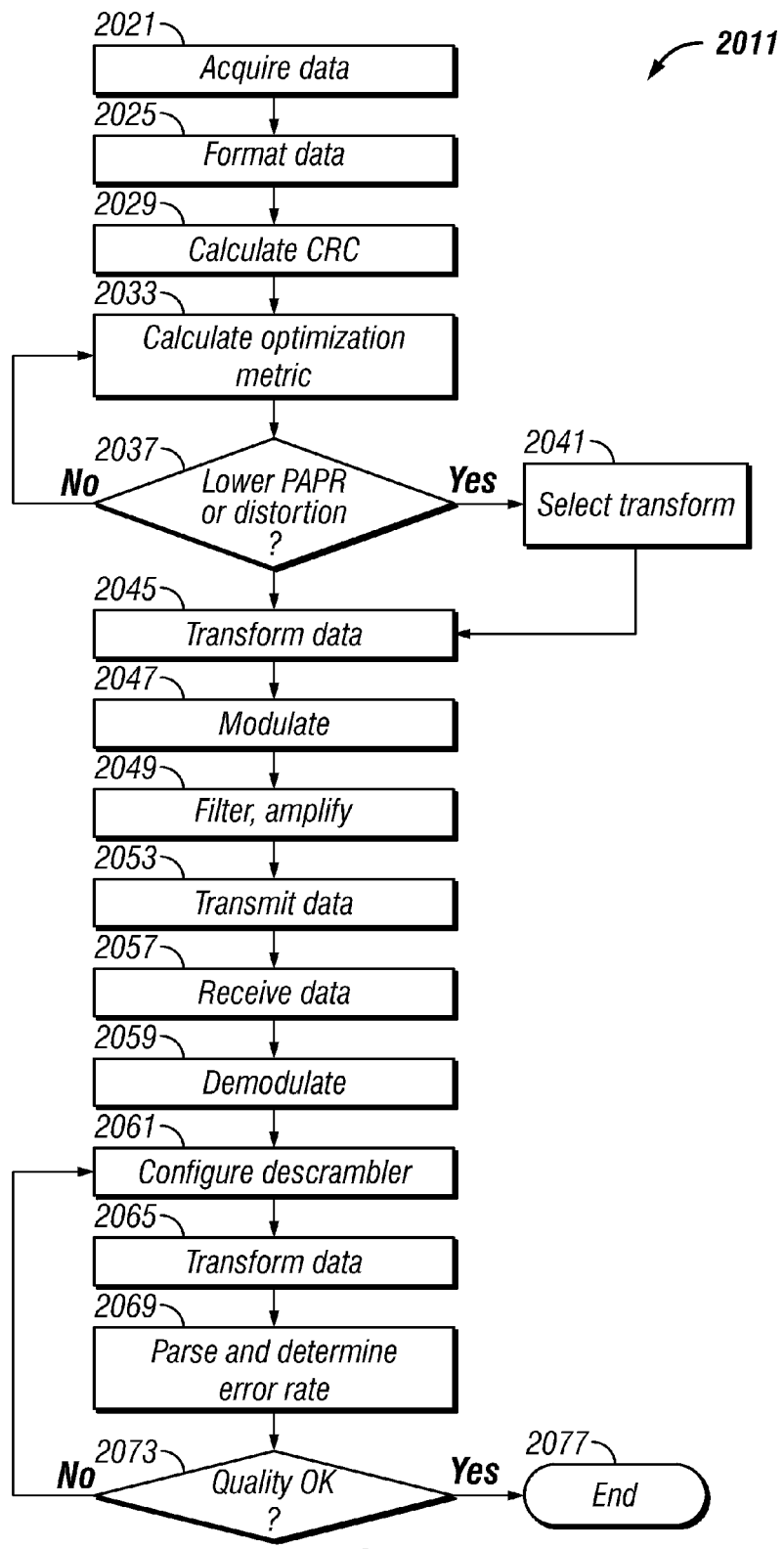
FIG. 20 is a flow chart illustrating several methods according to various embodiments of the invention.

For example, FIG. 20 is a flow chart illustrating several methods 2011 according to various embodiments of the invention. In some embodiments, a computer-implemented method 2011 may begin at block 2021 with acquiring data, perhaps from a down-hole tool carrying a variety of instrumentation.

The method 2011 may continue on to block 2025 with formatting the acquired data into the single, fixed length packets, each of the packets including at least one of an initial seed value or a polynomial indicator used in the transforming. The formatting can occur prior to transformation, or after transformation.

The method 2011 may continue on to block 2029 with calculating at least one of a cyclic redundancy checksum or parity data using at least one of the acquired data or the transformed data. The activity at block 2029 may further include inserting the at least one of the CRC or parity data into at least one of the fixed-length packets.

The method 2011 may continue on to block 2033 with calculating an optimization metric using at least one initial scrambler state selected from a plurality of initial scrambler states corresponding to a fixed scrambler configuration and a selected modulation scheme.

The method 2011 may continue on to block 2037 to determine whether the calculated optimization metric indicates and acceptable level of PAPR in the data stream to be transmitted, or perhaps an acceptable level of non-linear distortion—in either case, when compared to a selected quality criterion threshold.

Thus, if the threshold value is met at block 2037, the method 2011 may continue on to block 2041 with selecting at least one transform such that the amplified version has less than a selected amount of PAPR, or non-linear distortion, or some other measure of signal quality corresponding to a preselected quality criterion threshold. If the threshold value is not met at block 2037, then the method 2011 may return to block 2033, to include selecting different values for initial scrambler states and/or transforms implemented by the scrambler.

The method 2011 may continue on to block 2045 from either of blocks 2037 or 2041, to include transforming acquired data into transformed data using at least one transform selected from a plurality of transforms according to an optimization metric calculation that operates on single, fixed-length packets of the transformed data, and a preselected quality criterion threshold.

The method 2011 may continue on to block 2047 with modulating the electrical signal using the transformed data to provide the electrical signal as a superposition of waveforms.

In some embodiments, the method 2011 includes filtering the transformed data (e.g., using an interpolation filter), and then amplifying the data prior to transmission, at block 2049.

The method 2011 may continue on to block 2053 with transmitting an amplified version of an electrical signal in a geological formation, the electrical signal including the transformed data.

The method 2011 may continue on to block 2057 to include receiving an amplified version of an electrical signal in a geological formation, the electrical signal including transformed data.

The method 2011 may continue on to block 2059, to include demodulating the amplified version as a superposition of a plurality of waveforms into a plurality of numerical values comprising the transformed data.

The method 2011 may continue on to block 2061 to include configuring a descrambler to accomplish transformation (at block 2065) based on at least one of an initial seed value or a polynomial indicator, each selected according to a preselected quality criterion threshold, which may be the same or different as the threshold selected for the transmission process.

The method 2011 may continue on to block 2065 to include transforming the transformed data into an estimate of acquired data, the transforming using at least one transform selected from a plurality of transforms according to an optimization metric calculation that operates on single, fixed-length packets of the transformed data and/or the estimate, and the preselected quality criterion threshold.

The method 2011 may continue on to block 2069 to include parsing the estimate of acquired data to determine at least one of a cyclic redundancy checksum or parity data, and determining an error rate in the estimate based on the cyclic redundancy checksum and/or parity data.

At block 2073, the method 2011 may include comparing the error rate (or the PAPR, or some other measure of quality) with the preselected quality criterion threshold. If the quality of the received data is found to meet the desired, measurable level of quality, then the method 2011 may end at block 2077. Otherwise, the method 2011 may include returning to block 2061, to include re-configuring the descrambler by choosing different initial SEED values, or different transform POLY values.

The activity at blocks 2061 and 2073 may thus comprise determining at least one of an initial seed value or a polynomial indicator associated with the transformed data by attempting the transformation using multiple values of the initial seed value and/or the polynomial indicator until check data in the estimate indicates existence of a correct value. Many additional embodiments may be realized.

For example, a method of formatting digital data packet enabling transmission through a rock formation may comprise acquiring digital data, calculating a cyclic redundancy checksum using said digital data, calculating optimization metrics for at least one transform and modulation scheme suitable to propagate electrical current passing through a rock formation, the current communicating a plurality of transformations using said digital data, selecting a transformation using said optimization metrics, and generating transformed data using said digital data.

In another embodiment, a method of transmitting digital data packets through a rock formation may comprise acquiring digital data, calculating a cyclic redundancy checksum using said digital data, calculating optimization metrics for at least one transform and modulation scheme suitable for propagating electrical current through a rock formation, the current communicating a plurality of transformations using said digital data, selecting a transformation using said optimization metrics, generating transformed data using said digital data, and modulating the current passing through the rock formation by varying a voltage using said transformed data.

In another embodiment, a method of transmitting digital data packets through a rock formation may comprise acquiring digital data, calculating a cyclic redundancy checksum using said digital data, calculating optimization metrics using at least one initial scrambler state from a plurality of possible initial scrambler states of a predetermined scrambler configuration and a modulation scheme suitable to propagate electrical current through a rock formation, the current communicating a plurality of transformations using said digital data. The method may further comprise selecting an initial scrambler state for said predetermined scrambler configuration using said optimization metrics, scrambling said digital data to produce scrambled data, and modulating the current passing through the rock formation by varying a voltage using said scrambled data.

In another embodiment, a method of transmitting digital data packets through a rock formation may comprise acquiring digital data, calculating a cyclic redundancy checksum using said digital data, calculating optimization metrics using at least one initial scrambler state selected from a plurality of possible initial scrambler states for at least one scrambler configuration from a plurality of possible scrambler configurations, and selecting a modulation scheme suitable to propagate electrical current through a rock formation, the current communicating a plurality of transformations using said digital data. The method may further comprise selecting at least one scrambler configuration and at least one initial scrambler state using said optimization metrics, scrambling said digital data to produce scrambled data, and modulating the current passing through the rock formation by varying a voltage using said scrambled data.

Various methods may include calculating the optimization metrics using a cyclic redundancy checksum and/or parity data. Thus, the methods may comprise generating parity data using a forward error correction encoder. The cyclic redundancy checksum may be calculated using said parity data.

One or more transformations may be selected using a minimal or minimum optimization metric. Similarly, one or more transformation may be selected using a maximal or maximum optimization metric.

The optimization metric may be calculated using the transmission time of the formatted packet and/or the data rate of the formatted packet. Some embodiments may comprise interpolating said transformed data with a filter, and perhaps calculating optimization metrics using at least one characteristic of said filtering.

In an embodiment, a method of receiving digital data packets through a rock formation may comprise sensing at least one physical effect of the superposition of a plurality of waveforms from a multiple waveform modulated electrical current within said rock formation, demodulating said superposition of a plurality of waveforms into a plurality of numerical values, estimating digital values from said plurality of demodulated numerical values, transforming said estimated digital values using at least one transform selected from a plurality of transforms.

In an embodiment, a method of receiving digital data packets through a rock formation may comprise sensing at least one physical effect of the superposition of a plurality of waveforms from a multiple waveform modulated electrical current within said rock formation, demodulating said superposition of a plurality of waveforms into a plurality of numerical values, estimating digital values from said plurality of demodulated numerical values, scrambling said estimated digital values using at least one initial state value selected from a plurality of possible initial state values, and selecting at least one initial state value from said plurality of possible initial state values.

In an embodiment, a method of receiving digital data packets through a rock formation may comprise sensing at least one physical effect of the superposition of a plurality of waveforms from a multiple waveform modulated electrical current within said rock formation, demodulating said superposition of a plurality of waveforms into a plurality of numerical values, estimating digital values from said plurality of demodulated numerical values, selecting at least one polynomial indicator from a plurality of possible polynomial indicators, configuring a scrambler using at least in part the selected polynomial indicator, and scrambling said estimated digital values using at least one initial state value selected from a plurality of possible initial state values.

The selection of at least one initial state value may use at least a portion of said estimated digital values. Similarly, the selection of at least one polynomial indicator may at least a portion of said estimated digital values.

In some embodiments, the method may comprise calculating at least one cyclical redundancy checksum using transformed estimated digital values to enable determination of whether digital packets have been received correctly, or in error.

In some embodiments, the method may comprise determining a correct decoding event for said received digital packet by calculating a plurality of cyclical redundancy checksums of a plurality of transformed estimated digital values, respectively, and ceasing additional calculations of cyclical redundancy checksums for a given received digital packet upon the occurrence of a correct checksum check event.

In an embodiment, a method of communicating through a rock formation may comprise selecting a transform from a plurality of transforms available to a transmitter, transforming digital data using said selected transform enabling the receiver to perform an error-detection check, transmitting transformed digital data through a rock formation using a modulated waveform resembling a superposition of multiple waveforms, receiving the waveform from the rock formation, demodulating said received waveform in to a plurality of demodulated values, and identifying packet errors by using said plurality of demodulated values, said selected transform, and an error detection code value.

In an embodiment, a method of communicating through a rock formation may comprise calculating at least one optimization metric relating to a predetermined optimization criterion, selecting a initial state indicator from a plurality of initial state indicators available to the transmitter using said at least one of optimization metric, scrambling digital data using said selected initial state indicator enabling the receiver to perform an error-detection check, transmitting said scrambled digital data through a rock formation using a modulated waveform resembling a superposition of multiple waveforms, receiving a waveform from a rock formation in response to said transmitted modulated waveform, demodulating said received waveform into a plurality of demodulated values, and identifying packet errors by using said plurality of demodulated values, said selected transform, and an error detection code.

It should be noted that the methods described herein do not have to be executed in the order described, or in any particular order. Moreover, various activities described with respect to the methods identified herein can be executed in iterative, serial, or parallel fashion. The various elements of each method can be substituted, one for another, within and between methods. Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. The programs may be structured in an object-orientated format using an object-oriented language such as Java or C#. Alternatively, the programs can be structured in a procedure-orientated format using a procedural language, such as assembly or C. The software components may communicate using any of a number of mechanisms well known to those skilled in the art, such as application program interfaces or interprocess communication techniques, including remote procedure calls. The teachings of various embodiments are not limited to any particular programming language or environment. Thus, other embodiments may be realized.

Figure 21:
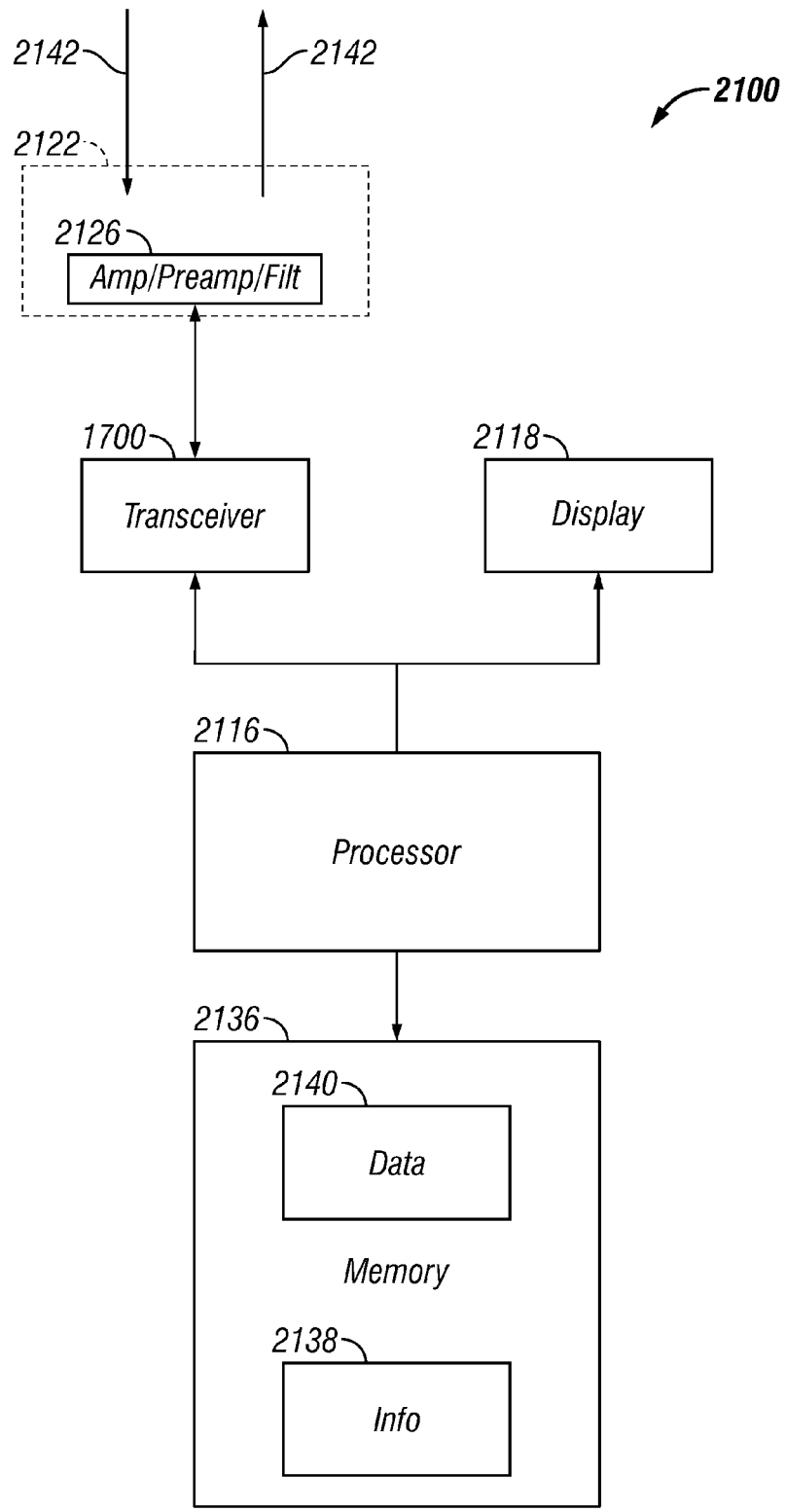
FIG. 21 is a block diagram of an article according to various embodiments of the invention.

For example, FIG. 21 is a block diagram of an article 2100 according to various embodiments of the invention, such as a computer, a memory system, a magnetic or optical disk, or some other storage device. The article 2100 may include one or more processors 2116 coupled to a machine-accessible medium such as a memory 2136 (e.g., removable storage media, as well as any tangible, non-transitory memory including an electrical, optical, or electromagnetic conductor) having associated information 2138 (e.g., computer program instructions and/or data), which when executed by one or more of the processors 2116, results in a machine (e.g., the article 2100) performing any actions described with respect to the apparatus, systems, and methods of FIGS. 1-20.

In some embodiments, the article 2100 may comprise one or more processors 2116 coupled to a display 2118 to display data processed by the processor 2116 and/or a wired or wireless transceiver 1700 (e.g., a downhole telemetry transceiver) to receive and transmit data processed by the processor.

The memory system(s) included in the article 2100 may include memory 2136 comprising volatile memory (e.g., dynamic random access memory) and/or non-volatile memory. The memory 2136 may be used to store data 2140 processed by the processor 2116, such as data acquired by down-hole tool instrumentation.

In various embodiments, the article 2100 may comprise communication apparatus 2122, which may in turn include amplifiers 2126 (e.g., preamplifiers or power amplifiers) and/or filters (e.g., interpolation filters, noise reduction filters, etc.). Signals 2142 received or transmitted by the communication apparatus 2122 may be processed according to the methods described herein.

Many variations of the article 2100 are possible. For example, in various embodiments, the article 2100 may comprise a downhole tool, such as the tool apparatus 1700 shown in FIG. 17.

Using the apparatus, systems, and methods disclosed herein may provide reduced transmitter hardware complexity (and expense) by reducing the PAPR of communication signals, and thus the dynamic range of the transmitter. The number of usable sub-channels and/or spreading codes may be increased, by minimizing the impact of each additional channel/code on the overall PAPR of the communication system. In a power constrained system, system throughput may be improved by reducing the power back-off needed to maintain the time-domain aggregate signal within the transmitter's dynamic range and/or facilitate the avoidance of non-linear distortion, e.g. clipping of peak voltages. Increased customer satisfaction may result.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus, comprising:
a scrambler module to transform acquired data into transformed data using at least one transform selected from a plurality of transforms according to an optimization metric calculation that operates on single, fixed-length packets of the transformed data and/or received data corresponding to the transformed data, and a preselected quality criterion threshold; and
an amplifier to receive an electrical signal including the transformed data, and to produce an amplified version of the electrical signal in a geological formation via a drill string.

2. The apparatus of claim 1, further comprising:
a linear feedback shift register configurable to accomplish the at least one transform using at least one of a selectable initial seed value or a selectable polynomial indicator.

3. The apparatus of claim 1, further comprising:
a modulator to provide the electrical signal by operating on the transformed data using orthogonal frequency division multiplex modulation or direct sequence spread spectrum modulation.

4. The apparatus of claim 1, further comprising:
a cyclic redundancy check processing module to generate a cyclic redundancy check value to be included in the transformed data or the electrical signal.

5. The apparatus of claim 1, further comprising:
an interpolation filter to operate on the transformed data.

6. The apparatus of claim 1, further comprising:
a portion of the drill string to house the scrambler module and the amplifier.

7. An apparatus, comprising:
a sensor to receive an amplified version of an electrical signal in a geological formation; and
a descrambler module to transform the electrical signal including transformed data into an estimated version of acquired data using at least one transform defined by at least one of a seed value or a polynomial indicator, the at least one transform selected from a plurality of transforms according to an optimization metric calculation that operates on single, fixed-length packets of the transformed data and/or the estimated version, and a preselected quality criterion threshold.

8. The apparatus of claim 7, wherein the preselected quality criterion threshold is based on at least one of a peak-to-average-power-ratio of the electrical signal, the transformed data, or an error rate of the estimated version.

9. The apparatus of claim 7, further comprising:
a shift register configurable to accomplish the at least one transform using at least one of an initial seed value or a polynomial indicator contained in the electrical signal.

10. A computer-implemented method, comprising:
transforming acquired data into transformed data using at least one transform selected from a plurality of transforms according to an optimization metric calculation that operates on single, fixed-length packets of the transformed data, and a preselected quality criterion threshold; and
transmitting an amplified version of an electrical signal in a geological formation, the electrical signal including the transformed data.

11. The method of claim 10, further comprising:
formatting the acquired data into the single, fixed length packets, each of the packets including at least one of an initial seed value or a polynomial indicator used in the transforming.

12. The method of claim 10, further comprising:
calculating at least one of a cyclic redundancy checksum (CRC) or parity data using at least one of the acquired data or the transformed data; and
inserting the at least one of the CRC or parity data into at least one of the fixed-length packets.

13. The method of claim 10, further comprising:
calculating the optimization metric using at least one initial scrambler state selected from a plurality of initial scrambler states corresponding to a fixed scrambler configuration and a selected modulation scheme.

14. The method of claim 10, further comprising:
modulating the electrical signal using the transformed data to provide the electrical signal as a superposition of waveforms.

15. The method of claim 10, further comprising:
selecting the at least one transform such that the amplified version has less than a selected amount of non-linear distortion corresponding to the preselected quality criterion threshold.

16. A computer-implemented method, comprising:
receiving an amplified version of an electrical signal in a geological formation, the electrical signal including transformed data; and
transforming the transformed data into an estimate of acquired data, the transforming using at least one transform selected from a plurality of transforms according to an optimization metric calculation that operates on single, fixed-length packets of the transformed data and/or the estimate, and a preselected quality criterion threshold.

17. The method of claim 16, further comprising:
configuring a descrambler to accomplish the transforming based on at least one of an initial seed value or a polynomial indicator, each selected according to the preselected quality criterion threshold.

18. The method of claim 16, further comprising:
parsing the estimate of acquired data to determine at least one of a cyclic redundancy checksum (CRC) or parity data;
determining an error rate in the estimate based on the CRC and/or parity data; and
comparing the error rate with the preselected quality criterion threshold.

19. The method of claim 16, further comprising:
determining at least one of an initial seed value or a polynomial indicator associated with the transformed data by attempting the transforming using multiple values of the initial seed value and/or the polynomial indicator until check data in the estimate indicates existence of a correct value.

20. The method of claim 16, further comprising:
demodulating the amplified version as a superposition of a plurality of waveforms into a plurality of numerical values comprising the transformed data.

* * * * *